(12) United States Patent
Lukashchuk et al.

(10) Patent No.: US 12,449,712 B2
(45) Date of Patent: Oct. 21, 2025

(54) OPTICAL FREQUENCY COMB BASED PARALLEL FM LIDAR

(71) Applicant: ECOLE POLYTECHNIQUE FEDERALE DE LAUSANNE, Lausanne (CH)

(72) Inventors: Anton Lukashchuk, Lausanne (CH); Johann Riemensberger, St-Sulpice (CH); Tobias Kippenberg, Aran (CH)

(73) Assignee: ECOLE POLYTECHNIQUE FEDERALE DE LAUSANNE, Lausanne (CH)

( * ) Notice: Subject to any disclaimer, the term of this patent is extended or adjusted under 35 U.S.C. 154(b) by 822 days.

(21) Appl. No.: 17/778,457

(22) PCT Filed: Nov. 22, 2019

(86) PCT No.: PCT/EP2019/082307
§ 371 (c)(1),
(2) Date: May 20, 2022

(87) PCT Pub. No.: WO2021/098975
PCT Pub. Date: May 27, 2021

(65) Prior Publication Data
US 2022/0413354 A1     Dec. 29, 2022

(51) Int. Cl.
*G02F 1/35*     (2006.01)
*G01S 17/58*    (2006.01)

(52) U.S. Cl.
CPC .......... *G02F 1/3515* (2013.01); *G01S 17/58* (2013.01); *G02F 2203/54* (2013.01); *G02F 2203/56* (2013.01)

(58) Field of Classification Search
CPC ............... G02F 1/3515; G02F 2203/54; G02F 2203/56; G01S 17/58; G01S 7/4911; G01S 7/4917; G01S 17/34; G01S 17/42
See application file for complete search history.

(56) References Cited

U.S. PATENT DOCUMENTS

| | | |
|---|---|---|
| 2011/0285980 A1 | 11/2011 | Newbury |
| 2019/0257927 A1 | 8/2019 | Yao |
| 2021/0381819 A1* | 12/2021 | Jang .................. G01B 9/02008 |

FOREIGN PATENT DOCUMENTS

| | | |
|---|---|---|
| CN | 209417296 U | 9/2019 |
| WO | 2014131425 A1 | 9/2014 |

OTHER PUBLICATIONS

International Search Report and Written Opinion from Corresponding International Application No. PCT/EP2019/082307, mailed on Jul. 21, 2020, 12 pages.

(Continued)

*Primary Examiner* — Georgia Y Epps
*Assistant Examiner* — Monica T Taba
(74) *Attorney, Agent, or Firm* — Tucker Ellis LLP

(57) ABSTRACT

In a LIDAR device (100) a laser light source (110) generates first laser light having a first laser frequency which is frequency modulated with a first frequency modulation. A non-linear optical element (120) receives the first laser light and generates therefrom second laser light having a comb-like frequency spectrum with a plurality of second laser frequencies which are each frequency modulated with a second frequency modulation defined by the first frequency modulation. A frequency excursion of the second frequency modulation is smaller than a spacing of the second laser frequencies. A diffractive element (140) spatially separates the second laser light according to the second laser frequencies and directs the spatially separated second laser light towards a ranging region (200), with each of the second laser frequencies being directed towards a corresponding spatially distinct target position in the ranging region (200). A detector (150) receives reflections of the second laser light from the ranging region (200) and measures, by simultaneously detecting a frequency modulation of the reflections for each (Continued)

of the second laser frequencies, a distance and/or a velocity at the target position corresponding to the second laser frequency.

20 Claims, 21 Drawing Sheets

(56) References Cited

OTHER PUBLICATIONS

N. Kuse et al., "Frequency-modulated comb LIDAR," APL Photonics 4, 106105, 2019, 11 pages.

* cited by examiner

OPTICAL FREQUENCY COMB BASED PARALLEL FM LIDAR

TECHNICAL FIELD

The present application relates to a device for laser ranging and detection (LIDAR) and to a LIDAR method.

BACKGROUND

In various fields, it is known to utilize a LIDAR technology for distance measurements and detection of moving objects. In the automotive field, the LIDAR technology is for example considered as a promising candidate for enabling autonomous driving. Autonomous vehicles require the ability to quickly recognize and classify objects in fast-changing and low visibility conditions. Here, the LIDAR technology can overcome challenges existing in the case of conventional camera imaging, such as those associated with weather conditions or illumination.

Currently employed LIDAR technologies are typically based on time-of-flight (TOF) detection of a scanning pulsed laser array. In the case of TOF detection, the distance of an object is determined based on the delay of returned laser pulses. To increase the speed of image recognition, a TOF LIDAR system may also utilize an array of individual lasers for parallelized image scanning. Although the TOF detection may allow for fast volumetric scanning, it only provides distance information. Information on velocity of an object can only be determined in an indirect manner by comparing subsequent images, which is however prone to errors, e.g., due to vehicle motion or interference.

Another known type of LIDAR technology, referred to as frequency-modulated continuous wave (FMCW) LIDAR, is based on coherent ranging using a frequency-modulated laser. In addition to distance information, the FMCW LIDAR technology and can also provide instantaneous velocity information by Doppler effect measurements. The instantaneous velocity information may help to accelerate detection and classification of objects. Further, the coherent ranging provides improved robustness with respect to stray light, can be implemented in a monostatic setup, and can achieve high sensitivity for long distance mapping. However, as compared to TOF LIDAR systems, an FMCW LIDAR system typically has a lower acquisition speed. Further, the FMCW LIDAR technology requires a laser source with precise frequency modulation.

US 2011/0285980 A1 describes a coherent LIDAR system which is based on utilizing optical frequency combs as a source and as a local oscillator for heterodyne detection. Here, the full frequency comb is utilized for illuminating a given target position.

"Frequency-modulated comb LIDAR" by N. Kuse and M. E. Ferman describes that coherent stitching of multiple channels from an electro-optical frequency comb generator can be used to improve measurement accuracy of FMCW LIDAR. The coherent stitching requires spectral overlap of adjacent comb modes. Also in this case, multiple comb modes are used for illuminate a single given target position.

Accordingly, there is a need for improved LIDAR technologies, which offer high image acquisition speed while at the same time providing a good robustness, high precision, and instantaneous velocity measurements.

SUMMARY

The present invention provides a LIDAR device according to claim 1 and a LIDAR method according to claim 16. The dependent claims define further embodiments.

According to an embodiment, a device for LIDAR is provided. The device comprises a laser light source, a non-linear optical element, a diffractive element, and a detector. The laser light source is configured to generate first laser light having a first laser frequency, which is frequency-modulated with a first frequency modulation. The non-linear optical element is configured to receive the first laser light and generate therefrom second laser light having a comb-like frequency spectrum with a plurality of second laser frequencies, which are each frequency modulated with a second frequency modulation defined by the first frequency modulation. A frequency excursion of the second frequency modulation is smaller than a spacing of the second laser frequencies. The diffractive element is configured to spatially separate the second laser light according to the second laser frequencies and direct the spatially separated second laser light towards a ranging region, with each of the second laser frequencies being directed towards a corresponding spatially distinct target position in the ranging region. The detector is configured to receive reflections of the second laser light from the ranging region and to measure, by simultaneously detecting a frequency modulation of the reflections for each of the second laser frequencies, at least one of a distance and a velocity at the target position corresponding to the second laser frequency. Accordingly, the different frequencies of the comb-like frequency spectrum can be utilized in a parallelized manner for simultaneous measurements on different target positions. As a result, a high image acquisition speed can be achieved.

According to an embodiment of the device, the non-linear optical element comprises at least one photonic resonator, e.g., implemented on a photonic microchip. In this way, the comb-like frequency spectrum can be generated in an efficient manner, with precisely controlled characteristics. The non-linear optical element may have a second order non-linear characteristic and/or a third order non-linear characteristic.

According to an embodiment of the device, the non-linear optical element is configured to generate the second laser light having the comb-like frequency spectrum based on pumping a dissipative Kerr soliton (DKS) in the photonic resonator by the first laser light. In this case, a frequency excursion of the first frequency modulation may be within a frequency range selected to support stable generation of the DKS.

According to an embodiment, the device comprises a tuning mechanism configured to modulate tuning of the photonic resonator depending on the first frequency modulation. This may allow for compensating undesired effects of the first frequency modulation on the second frequency modulation, such as amplitude modulation or other variations of the light of the second laser frequencies. Further, this may allow for facilitating generation of the DKS.

According to an embodiment, the device additionally comprises a further non-linear optical element configured to generate third laser light having a comb-like frequency spectrum with a plurality of third laser frequencies which have a frequency spacing offset with respect to a frequency spacing of the second laser frequencies. The further non-linear optical element may have similar characteristics as explained above for the non-linear optical element. The further non-linear optical element may receive the first laser light and generate the third laser light from the first laser light. In this embodiment, the detector may be configured to detect the frequency modulation of the reflections by mixing the third laser light with the reflections of the second laser light and directing the mixed light to a photodetector. The third laser light may thus be utilized as a local oscillator for heterodyne detection of the frequency modulation of the reflections. In an alternative embodiment, the detector may be configured to detect the frequency modulation of the reflections by mixing the second laser light with the reflections of the second laser light and directing the mixed light to a photodetector, i.e., to detect the frequency modulation of the reflections by homodyne detection.

According to an embodiment of the device, the detector comprises multiple photodetectors and is configured to direct light corresponding to different ones of the second laser frequencies to different ones of the multiple photodetectors. Accordingly, parallelized detection of the distance and/or velocity for the different target positions can be efficiently supported by multiple photodetectors.

According to an embodiment, the device further comprises a scanning mechanism configured to sequentially scan the target positions over different portions of the ranging region. In this way, parallelized detection for multiple target positions can be combined with scanning to thereby cover a wider ranging region.

According to an embodiment of the device, the device is configured to control the first frequency modulation by a control signal and the device further comprises an adjustment stage configured to measure a deviation of the first frequency modulation from a desired modulation waveform and to adjust the control signal depending on the measured deviation. In this way, precision of the second frequency modulation can be enhanced and detection accuracy improved.

According to a further embodiment, a method for LIDAR is provided. The method comprises:
  generating first laser light having a first laser frequency which is frequency modulated with a first frequency modulation;
  receiving the first laser light in a non-linear optical element to generate therefrom second laser light having a comb-like frequency spectrum with a plurality of second laser frequencies which are each frequency modulated with a second frequency modulation defined by the first frequency modulation, with a frequency excursion of the second frequency modulation being smaller than a spacing of the second laser frequencies;
  spatially separating the second laser light by a diffractive element;
  directing the spatially separated second laser light towards a ranging region, with each of the second laser frequencies being directed towards a corresponding spatially distinct target position in the ranging region;
  receiving reflections of the second laser light from the ranging region; and
  measuring, by simultaneously detecting a frequency modulation of the reflections for each of the second laser frequencies, at least one of a distance and a velocity at the target position corresponding to the second laser frequency.

As can be seen, the above-mentioned LIDAR device is configured to operate according to the method.

According to an embodiment of the method, the non-linear optical element comprises at least one photonic resonator. In this case, the non-linear optical element may generate the second laser light having the comb-like frequency spectrum based on pumping a dissipative Kerr soliton in the photonic resonator by the first laser light. A frequency excursion of the first frequency modulation may then be within a frequency range selected to support stable generation of the dissipative Kerr soliton.

According to an embodiment, the method further comprises modulating tuning of the photonic resonator depending on the first frequency modulation. This may allow for compensating undesired effects of the first frequency modulation on the second frequency modulation, such as amplitude modulation or other variations of the light of the second laser frequencies. Further, this may allow for facilitating generation of the DKS.

According to an embodiment of the method, the non-linear optical element has at least one of a second order non-linear characteristic and a third order non-linear characteristic.

According to an embodiment of the method, the method may comprise:
  by a further non-linear optical element, generating third laser light having a comb-like frequency spectrum with a plurality of third laser frequencies which have a frequency spacing offset with respect to a frequency spacing of the second laser frequencies,
  detecting the frequency modulation of the reflections by mixing the third laser light with the reflections of the second laser light and directing the mixed light to a photodetector.

According to an alternative embodiment, the method may comprise detecting the frequency modulation of the reflections by mixing the second laser light with the reflections of the second laser light and directing the mixed light to a photodetector.

According to an embodiment of the method, the method may comprise directing light corresponding to different ones of the second laser frequencies to different ones of multiple photodetectors.

According to an embodiment of the method, the method may comprise sequentially scanning the target positions over different portions of the ranging region.

According to an embodiment of the method, the method may comprise:
  controlling the first frequency modulation by a control signal;
  measuring a deviation of the first frequency modulation from a desired modulation waveform; and
  adjusting the control signal depending on the measured deviation.

In the above device or method, the second frequency modulation may be a linear function of the first frequency modulation. Accordingly, a distortion-free transfer of the frequency modulation of the first laser light to the comb-like frequency spectrum of the second laser light can be achieved. The frequency excursion of the second frequency modulation may be within at least 500 MHz, and a range of up to 10 GHz may be used for higher accuracy. A frequency spacing of the second laser frequencies may be at least 50 GHz. A modulation frequency of the first frequency modulation and of the second frequency modulation may be from 1 kHz to 10 MHz. The first frequency modulation and the second frequency modulation may be of a triangular type. Accordingly, the first laser light and the second laser light may be frequency chirped. However, it is noted that other types of frequency modulation could be used as well, e.g., of a sigmoidal type or frequency-shift keying type.

Details of such embodiments and further embodiments will be apparent from the following detailed description of embodiments.

BRIEF DESCRIPTION OF THE DRAWINGS

FIGS. 10A, 10B, and 100 show further exemplary measurement results obtained by a LIDAR device according to an embodiment of the invention.

DETAILED DESCRIPTION OF EMBODIMENTS

In the following, concepts in accordance with exemplary embodiments of the invention will be explained in more detail and with reference to the accompanying drawings. The illustrated embodiments relate to frequency modulated (FM) LIDAR using probe laser light having a comb-like frequency spectrum. The comb-like frequency spectrum is a frequency spectrum formed of a plurality of substantially equidistant narrow spectral lines and will in the following also be referred to as optical frequency comb. The optical frequency comb is generated by using a single frequency-modulated laser light source to pump a non-linear optical element, e.g., based on a microresonator formed on a photonic chip. The frequency modulation of the pump laser translates into a frequency modulation of the individual comb teeth of the optical frequency comb. A diffractive element is utilized for spatially separating the comb teeth and directing the light of the comb teeth to different target points in a ranging region. By detecting frequency modulation of light reflected from the ranging region simultaneously for each of the different target points, measurement of distance and/or velocity can be parallelized in an efficient manner.

Figure 1:
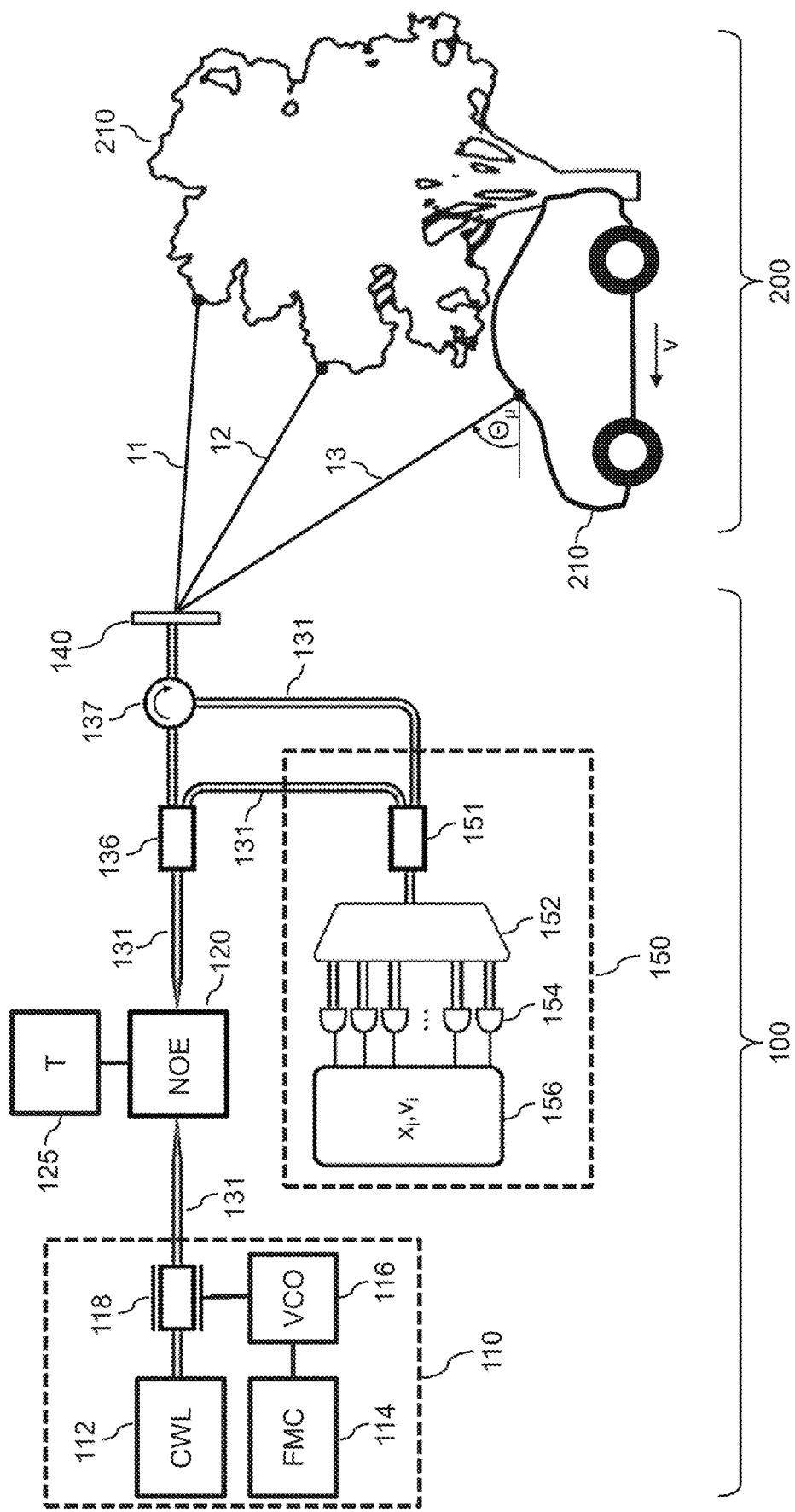
FIG. 1 schematically illustrates an example of a LIDAR arrangement according to an embodiment of the invention.

FIG. 1 schematically illustrates a LIDAR arrangement implementing the concepts as outlined above. In particular, FIG. 1 illustrates a LIDAR device 100 and a ranging region 200. In the illustrated example, the ranging region includes a moving object 210 (in the illustrated example a vehicle), and a stationary object 220 (in the illustrated example a tree).

The LIDAR device 100 includes a pump laser source 110, a non-linear optical element (NOE) 120, a tuning stage 125 for the NOE 120, a diffractive element 140, and a detector 150, which are coupled to each other by light guiding elements 131, 136, 137.

Figure 2A:
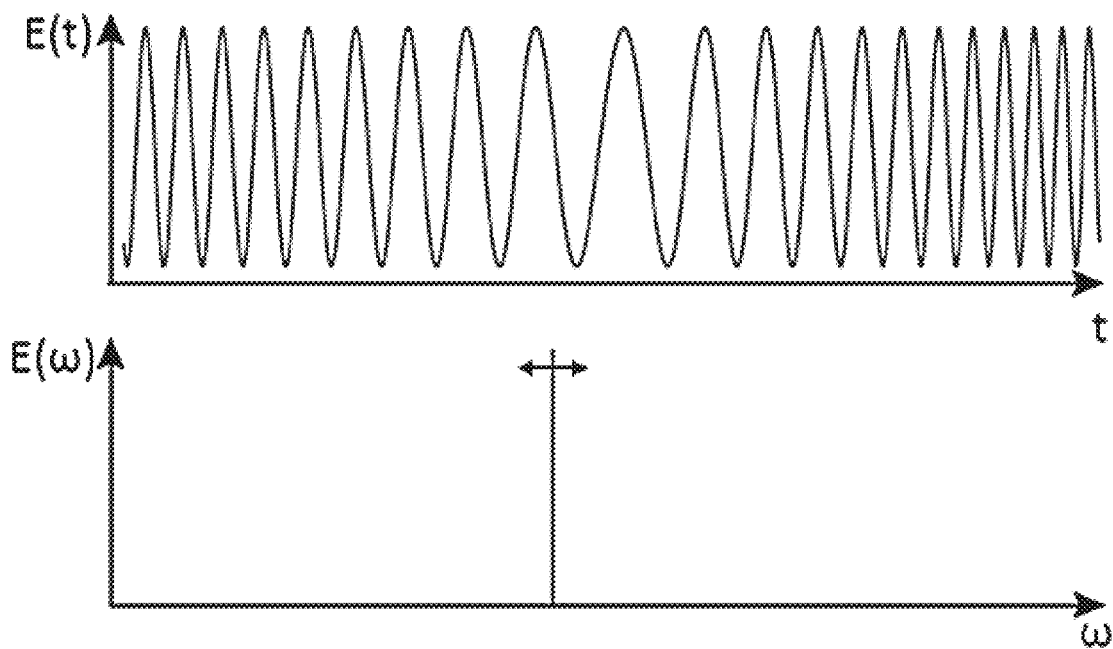
FIG. 2A schematically illustrates characteristics of pump laser light as used in a LIDAR device according to an embodiment of the invention.

The pump laser source 110 generates frequency modulated pump laser light. For this purpose, the pump laser source 110 is provided with a continuous wave laser 112, e.g., an external cavity diode laser (ECDL), a frequency modulation controller (FMC) 114, a voltage controlled oscillator VCO 116, and an electro-optical modulator 118, e.g., a QPSK (quadrature phase-shift keying) based electro-optical modulator which is biased to single sideband operation (SSB). The FMC 114 provides a control voltage defining the waveform of frequency modulation. In the illustrated example, it is assumed that the pump laser light is chirped by applying a frequency modulation having a triangular waveform. It is however noted that the frequency modulation could also be based on other waveforms, e.g., a sigmoidal waveform or a rectangular waveform when using frequency-shift keying type modulation formats. Further, it is noted that utilization of an electro-optical modulator is merely exemplary and that other ways of frequency modulating the pump laser light could be used as well, e.g., acousto-optic modulation. FIG. 2A shows a time domain representation and a frequency domain representation for schematically illustrating characteristics of the pump laser light generated by the pump laser source 110. A double-headed arrow in the lower panel of FIG. 2A illustrates the frequency modulation of the pump laser light. As can be seen, the frequency spectrum of the pump laser light consists of a single frequency, which is modulated within a certain frequency range.

Figure 2B:
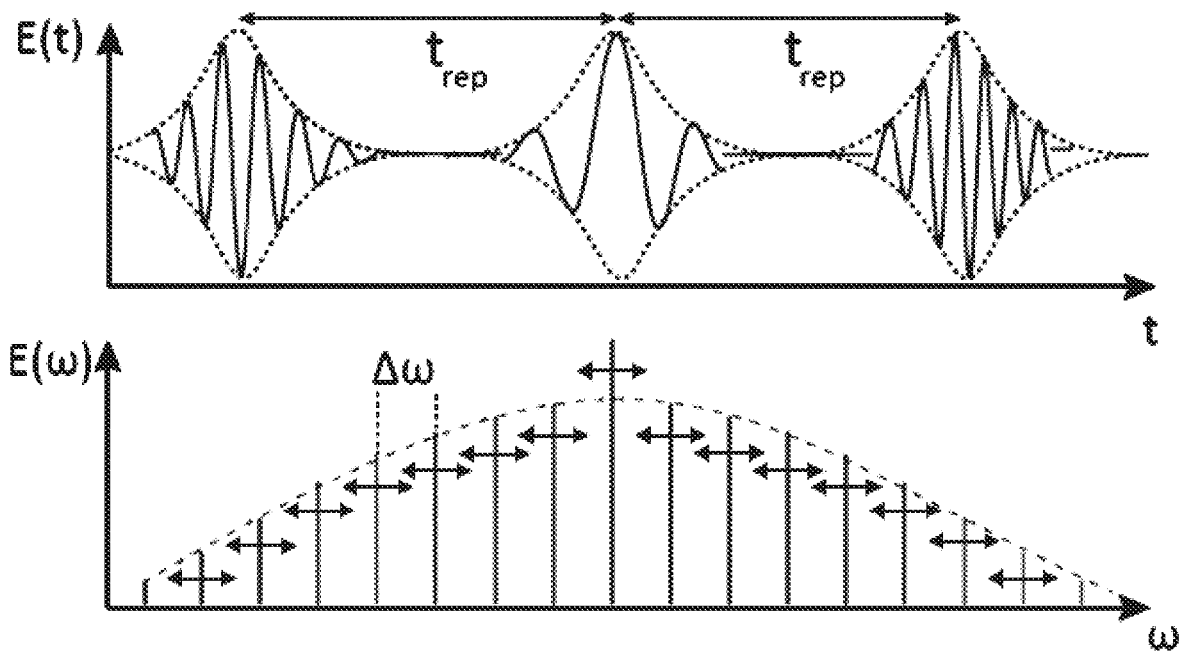
FIG. 2B schematically illustrates characteristics of probe laser light as used in a LIDAR device according to an embodiment of the invention.

The pump laser light 120 is received in the NOE 120, which generates an optical frequency comb from the pump laser light. Details concerning operation and possible implementations of the NOE 120 are further explained below. FIG. 2B shows a time domain representation and a frequency domain representation for schematically illustrating characteristics of the optical frequency comb generated by the NOE 120. In the time domain, the light of the optical frequency comb consists of pulses which are generated according to a given repetition rate $1/t_{rep}=\Delta\omega$. In the frequency domain, the optical frequency comb consists of a plurality of non-overlapping frequency lines, which have substantially equal spacing and are centered around the frequency of the pump laser light. The frequency lines of the optical frequency comb are herein also referred to as "comb teeth". Double-headed arrows in the lower panel of FIG. 2B illustrate the frequency modulation of the individual comb teeth of the optical frequency comb. As can be seen, the comb teeth are each modulated within a frequency range which is smaller than a frequency spacing of neighboring comb teeth. The spacing of the comb teeth is at least 50 GHz, e.g. 100 GHz or even more. The comb teeth of the optical frequency comb be regarded as individual laser sources of different wavelengths, which are frequency modulated in a coordinated manner.

In the LIDAR device 100, the light of the optical frequency comb is guided through a beam splitter 136 and an optical circulator 137, e.g., a magneto-optical circulator, to a diffractive element 140. The diffractive element may for example be based on a diffractive grating and/or a prism. The diffractive element 140 spatially separates the optical frequency comb according to the frequencies of the individual comb teeth. As a result, the optical frequency comb is separated into multiple beams each directed towards a different target position in the ranging region. By way of example, FIG. 1 illustrates beams 11, 12, 13. It is however noted that in practical implementations the number of utilized beams, i.e., spatial channels, can be significantly higher, e.g., 30, 100, or even more. The above-mentioned spacing of at least 50 GHZ, typically 100 GHz or even more, and the smaller range of frequency modulation of the comb teeth allows for avoiding that the frequency modulation causes spatial overlap of light directed to adjacent target positions. Further, the spacing allows for sufficient spatial separation by the diffractive element to ensure a wide field of view of the LIDAR device 100.

The LIDAR device 100 receives reflected light from the different target positions, and the optical circulator 137 guides the reflected light to the detector 150. Accordingly, the illustrated example may be regarded as being based on a monostatic detection scheme in which a transmit beam path to the ranging region and a receive beam path from the ranging region coincide, e.g., share a common collimator at a light output/input of the LIDAR device 100, and are separated by the circulator 137. It is noted that as an alternative to the circulator 137, the transmit beam path and the receive beam path could also be separated using a quarter wave plate and a polarizing beam splitter. In other variants the LIDAR device 100 could also utilize a bi-static detection scheme with separate transmit and receive beam paths, e.g., using separate collimators for the transmit and receive beam paths. In such bi-static variants, the circulator could be omitted.

As can be seen, the beam splitter 136 also provides light of the optical frequency comb to the detector 150, where it is used as a basis for homodyne detection of the frequency modulation of the reflected light. The ratio of the beam splitter can for example be 90:10, with 90% of the light of the optical frequency comb being provided towards the ranging region 200, and 10% of the light of the optical frequency comb being provided to the detector 150.

Figure 3A:
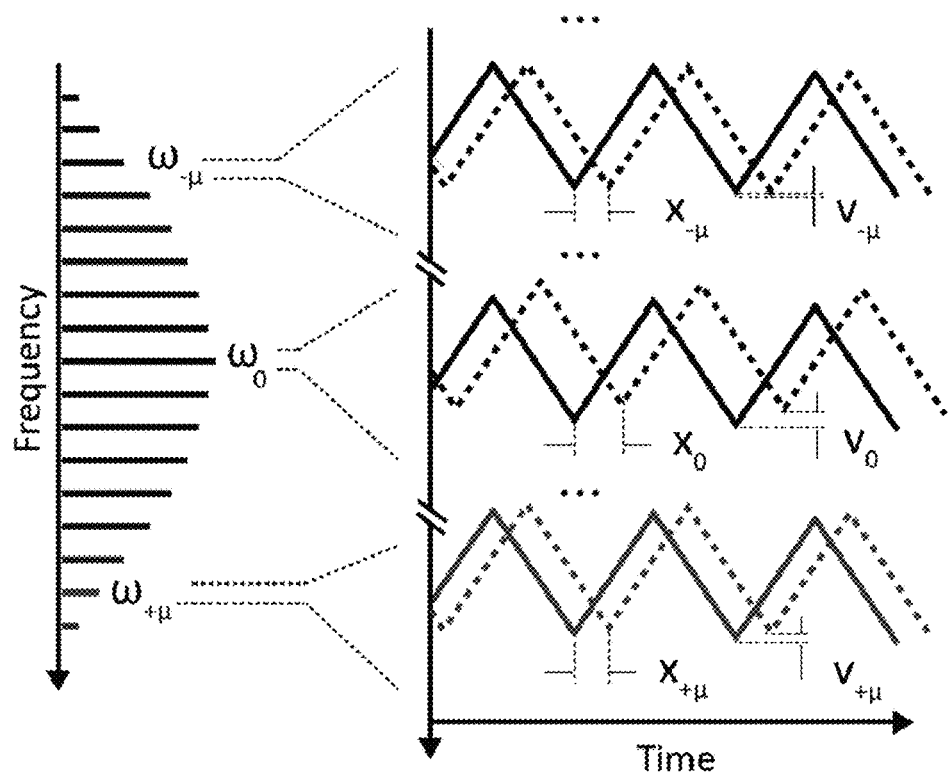
FIGS. 3A and 3B schematically illustrate homodyne detection of distance and velocity as used in a LIDAR device according to an embodiment of the invention.
Figure 3B:
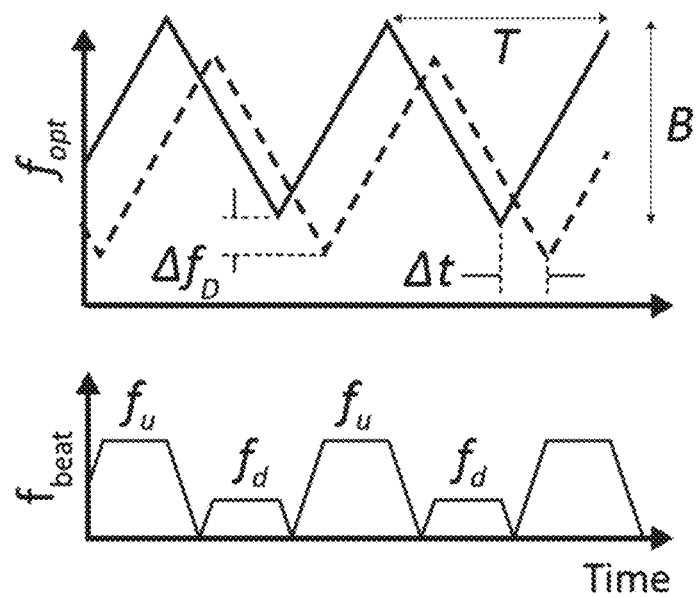

In the example of FIG. 1, the detector 150 includes an optical mixer 151, e.g., having a mixing ratio of 50:50, which combines the light of the optical frequency comb with the reflected light from the ranging region. The mixed light is provided to an optical demultiplexer 152, which separates the different frequencies of the optical frequency comb and provides the light of each individual frequency to a corresponding photodetector 154. The output of the photodetectors 154 is evaluated by a measurement logic 156. Due to different signal runtimes (TOF) of the light reflected from the ranging region and the directly received light of the optical frequency comb and due to Doppler shift of the reflected light, output signals of the photodetectors exhibit a beat note, with generally two beat note frequencies $f_{u,\mu}$, $f_{d,\mu}$ for each target position. Here, $\mu$ denotes an index of the target position and the corresponding comb tooth, with $\mu=0$ corresponding to a center tooth of the optical frequency comb, e.g., defined by the frequency of the pump laser light. The measurement of the frequencies by the measurement logic 156 may be based on a short-time Fourier transform. The principle of underlying the measurements of distance and velocity based on the homodyne detection of frequency modulation of the reflected light is illustrated in FIGS. 3A and 3B, where solid signal traces illustrate the frequency modulated light of the optical frequency comb and broken signal traces illustrate the frequency modulated reflected light. The upper panel of FIG. 3B illustrates the course of the optical domain frequencies $f_{opt}$, and the lower panel in FIG. 3B also illustrates the observed beat note $f_{beat}$.

When assuming a chirp modulation using frequency modulation according to a triangular waveform around a center frequency $f_c$ with a modulation period T and frequency excursion of B, the distance of the target position $\mu$ can be calculated according to $$x_\mu = \frac{cT}{4B} \frac{f_{u,\mu} + f_{d,\mu}}{2}, \qquad (1)$$

and the velocity at the target position $\mu$ can be calculated according to $$v_\mu = \frac{c}{2f_c \cos\theta_\mu} \frac{d_{u,\mu} - f_{d,\mu}}{2}, \qquad (2)$$

where $\theta_\mu$ denotes an angle of the light beam relative to a movement direction of a moving object at the target position $\mu$ (in the illustrated example of a moving vehicle assumed to be horizontal). Since the beat notes can be measured simultaneously for multiple comb teeth and thus for multiple target positions in the ranging region 200, the LIDAR process can be parallelized and image acquisition time significantly reduced by avoiding or reducing sequential scanning of different target positions. This may for example be highly beneficial in the case of automotive applications requiring quick detection and classification of objects.

It is noted that the components of the LIDAR device 100 as illustrated in FIG. 1 are exemplary and that, depending on the considered application scenarios, other or different components could be provided. For example, the LIDAR device 100 could be provided with a scanning mechanism for directing the spatially separated light of the optical frequency comb to different portions of the ranging region, thereby widening the area which can be covered by the distance and velocity measurements. Further, the LIDAR device could include additional optical elements, such as amplifiers or other elements for conditioning the light of the optical frequency comb, e.g., a gain flattening erbium-doped fiber amplifier (EDFA), lenses, fiber spools, or collimators.

Figure 4:
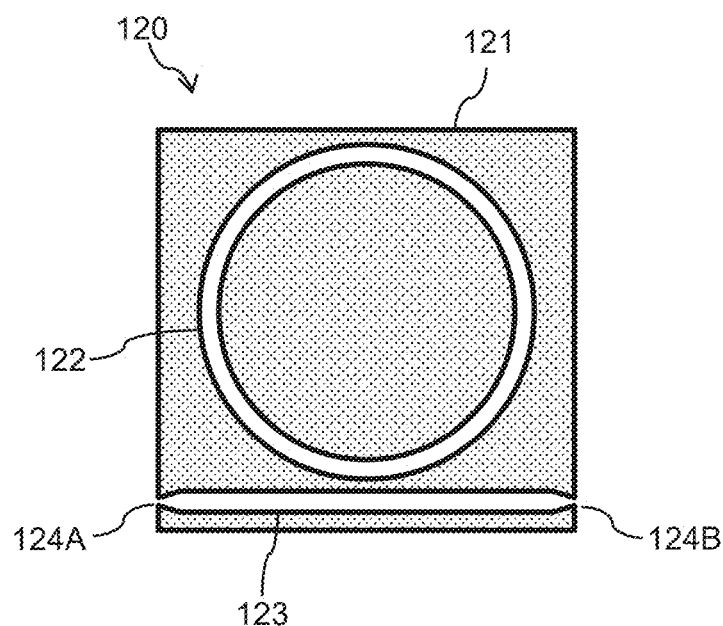
FIG. 4 schematically illustrates a non-linear optical element as used in a LIDAR device according to an embodiment of the invention.

FIG. 4 schematically illustrates an exemplary implementation of the NOE 120 which is used for generating the optical frequency comb. In the illustrated example, the NOE 120 is based on a photonic chip 121 and a microresonator 122 formed by a ring waveguide cavity on the photonic chip 121. A coupling waveguide 123 with an input 124 and an output 125 at edges of the photonic chip 121 is provided for coupling the pump laser light into the photonic chip 121 and for coupling the light of the optical frequency comb from the photonic chip 121.

The photonic chip 121 may be based on $Si_3N_4$, which exhibits and may be fabricated using a photonic damascene process as for example described in "Photonic Damascene Process for Low-Loss, High-Confinement Silicon Nitride Waveguides" by M. H. P. Pfeiffer et al., IEEE Journal of Selected Topics in Quantum Electronics vo. 24, no. 4 (2018), utilizing DUV (deep ultraviolet) stepper lithography and silica preform reflow. However, it is noted that other materials or fabrication processes could be used as well. For example, the NOE 120 could be implemented on the basis of a waveguide or whispering gallery mode cavity formed in other optical materials like silicon, diamond, AlN, AlGaAs, GaP, $LiNbO_3$, Hydex, or the like, or on the basis of a microdisk formed in $SiO_2$ or silica, or the like.

In examples as further detailed below, the waveguide cross-section of the microresonator 122 is 1.5 μm in width and 0.82 μm in height, with anomalous second order dispersion of $D_2/2\pi=1.13$ MHz and third-order dispersion of $D_3/2\pi=576$ Hz. The ring radius is 228.39 μm, resulting in a resonator free-spectral-range of $D_1/2\pi=98.9$ GHz, which provides a reasonable match with 100 GHz telecom ITU grid optical components. For generating the optical frequency comb, the microresonator 122 is operated in a strongly overcoupled regime with intrinsic loss rate $\kappa_0/2\pi=15$ MHz and bus waveguide coupling rate $\kappa_{ex}/2\pi=100$ MHz. Operation in the overcoupled regime bears the advantage of suppressing thermal non-linearities during tuning and increased power per comb line and optical signal to noise ratio after post-amplification. Input and output coupling of light to and from the photonic chip 121 may be facilitated by providing double inverse tapers of the coupling waveguide 123 and/or by using lensed fibers coupled to the input 124 and the output 125.

The NOE 120 of the illustrated example generates the optical frequency comb by using the pump laser light provided by the pump laser source 110 to pump a DKS in the microresonator 122. As illustrated by the upper panel of FIG. 2B, this process can be viewed as modulating a carrier frequency underlying the DKS, while minimizing changes of pulse envelope and repetition rate.

The DKS may be generated as follows: The pump laser light, e.g., having a wavelength of 1553.3 nm, is coupled into the microresonator 122 on the photonic chip 121, and the pump laser source 110 and the microresonator 122 are tuned into resonance, e.g., using the tuning stage 125. The tuning stage 125 can for example be based on a piezo tuning scheme. The resonance of the microresonator 122 may be is aligned to the ITU grid channel 30 at a wavelength of 1553.3 nm, e.g., by using a thermo-electric cooling device located below the photonic chip 121. The generated DKS is coupled back into the coupling waveguide, and the resulting optical frequency comb, which also includes the line of the pump laser light, can be extracted by coupling an optical fiber to the output 125 of the photonic chip 121. The carrier-frequency of the pump laser light may then be actively modulated by external SSB modulation using FMC 114, the VCO 116, and the electro-optical modulator 118.

By using a frequency modulation of the pump laser light which is compatible with existence of the DKS in the microresonator 122, the soliton pulse stream of the DKS acquires a rapid change in the underlying carrier waveform, while retaining its pulse-to-pulse repetition rate. As a result, the frequency modulation of the pump laser light is simultaneously transferred to all spectral comb teeth of optical frequency comb. It was found that this arrangement allows for generating more than 30 distinct frequency channels with frequency modulation rates of up to 20 GHz per microsecond. In the LIDAR device 100, this in turn enables parallelized distance and velocity measurements for a corresponding number of different target positions, e.g., 30, 100, or even more different target positions. The parallelized measurements in turn allow for achieving an image acquisition rate of the LIDAR device 100, which can be up to two orders of magnitude higher than in conventional FMCW LIDAR systems. Further, the LIDAR device 100 may be implemented by using only a single laser source, i.e., the CWL 112, which can be efficiently integrated with the photonic chip 121 of the NOE 120 and other components of the LIDAR device 100. Accordingly, the LIDAR device 100 can be implemented in a compact manner and with low complexity.

In the illustrated example, several characteristic of the DKS in the photonic microresonator 122 may be utilized: a relatively large existence range of the soliton when detuning the pump laser light, e.g., allowing detuning by several GHz, relatively small repetition rate changes of the DKS when detuning the pump laser light, and the possibility to very rapidly transition between stable operating points without destroying the DKS. In combination, these features allow to transfer a linearized frequency modulation of the pump laser light to each comb line, which can be spatially separated by the diffractive element 140.

Figure 5A:
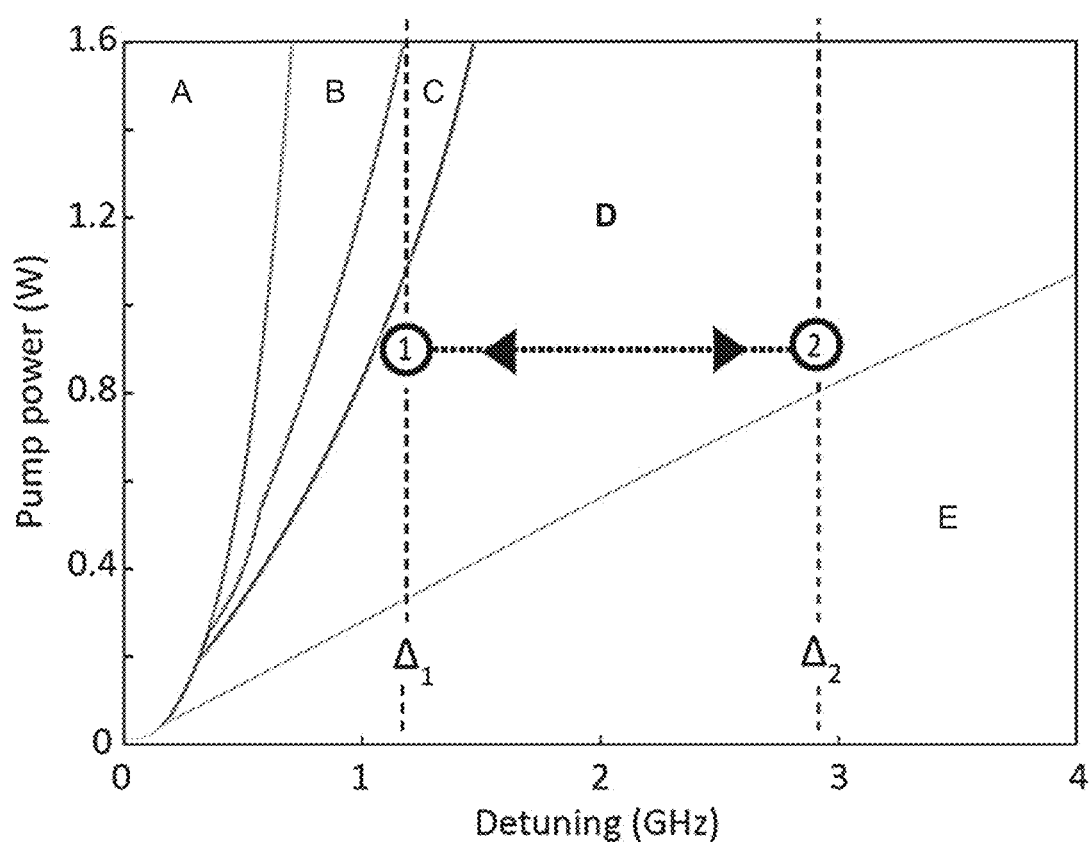
FIG. 5A schematically illustrates selection of an operating regime for an optical frequency comb in a LIDAR device according to an embodiment of the invention.
Figure 5B:
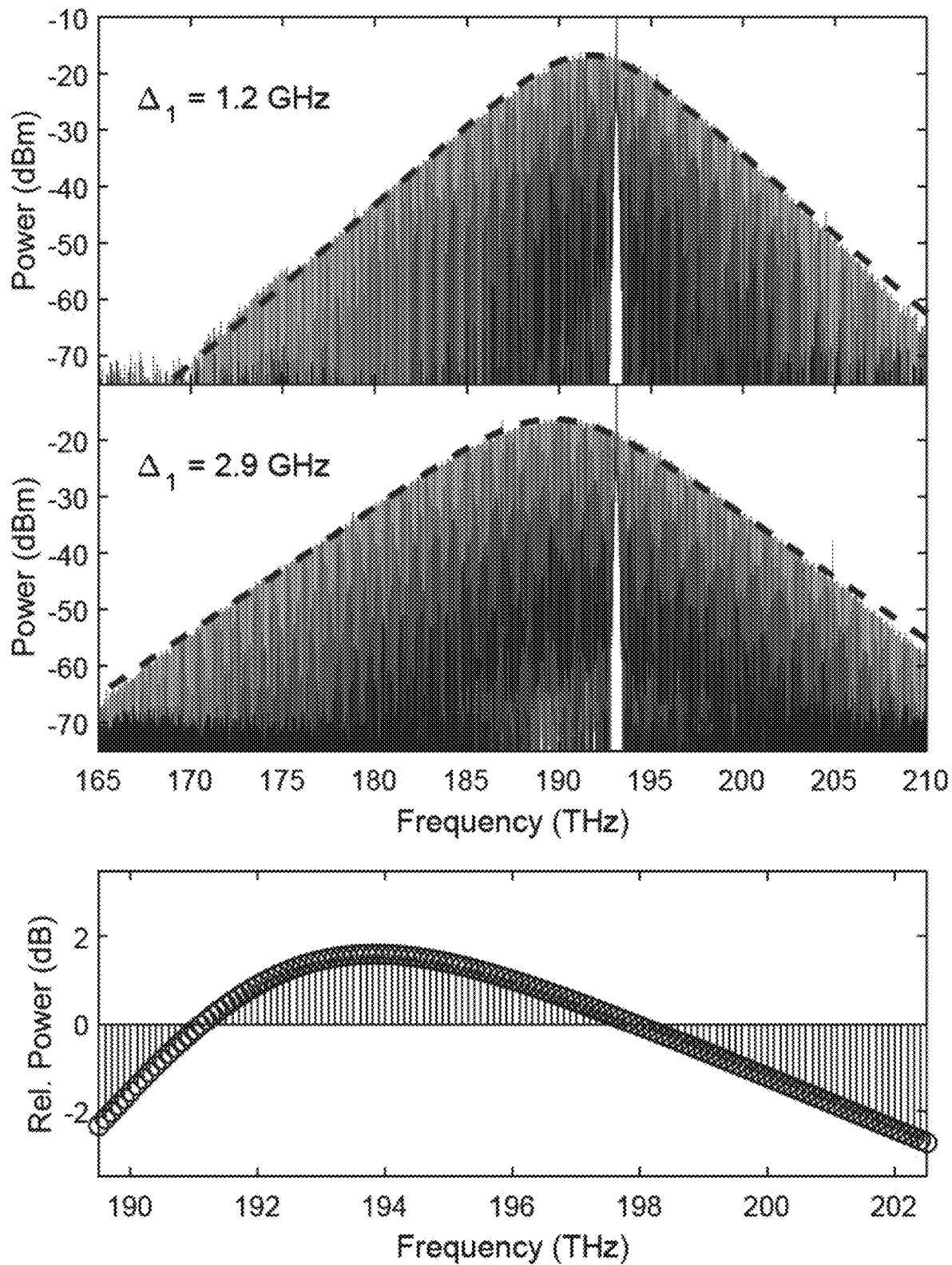
FIG. 5B shows measured spectra of an optical frequency comb as used in a LIDAR device according to an embodiment of the invention.

FIG. 5A shows results of numerical simulations based on the Lugiato-Lefever equation (LLE), which demonstrate the range of existence of the DKS while detuning the pump laser light. As can be seem, depending on the detuning of the pump laser light, different regimes of the light filed in the microresonator 122 can be identified: a regime denoted by "A", corresponding to modulation instabilities, a regime denoted by "B", corresponding to chaotic behavior, a regime denoted by "C", corresponding to occurrence of breathers, a regime denoted by "D", corresponding to existence of the DKS, and a regime denoted by "E", corresponding to existence of a continuous wave light field. In the LIDAR device 100, the frequency modulation of the pump laser light is set to match the regime "D", which supports stable existence of the DKS in the microresonator 122. The maximum value of detuning, which still supports stable generation of the DKS, depends on power of the pump laser light, which in turn is typically limited by a Raman non-linearity of the microresonator. Thermal non-linearities may be suppressed by operating the microresonator in the strongly overcoupled regime. As indicated in FIG. 5A, at a pump power of 0.9 W, a lower limit of the DKS regime is at a detuning value of $\Delta_1=1.2$ GHz, and an upper limit of the DKS regime is at a detuning value of $\Delta_2=2.9$ GHz, defining a modulation region which allows for a frequency excursion of 1.7 GHz without destroying the DKS state. FIG. 5B shows the measured optical spectra of the DKS at the these limits of the DKS regime. Here, it is noted that due to the high number of spectral lines corresponding to the comb teeth, the separation of neighboring comb teeth may not be resolved in the figure. However, with the spectral resolution measurement of 2.5 GHz and the spacing of the spectral lines being 100 GHz, the comb teeth are well separated. The lower panel of FIG. 5B shows relative line-by-line power differences between the spectra at the detuning value of $\Delta_1=1.2$ GHz and at the detuning value of $\Delta_2=2.9$ GHz, obtained from a $sech^2$ fit to the spectra. As can be seen, despite the frequency excursion between these detuning values strongly exceeding the overcoupled cavity linewidth of the microresonator (defined by $\kappa_0/2\pi$=15 MHz and $\kappa_{ex}/2\pi$=100 MHz), the power of the comb teeth between 190 and 200 THz does not change by more than 3 dB. This shows that the generated optical frequency comb may provide 90 or more channels suitable for coherent LIDAR in the telecom S, C and L bands. It is noted that the values shown in FIGS. 5A and 5B are merely exemplary and that a wider modulation region could for example be achieved by using a higher pump power. Further, it is noted that a power modulation in the range shown by the lower panel of FIG. 5B does not adversely affect evaluation of distances and velocities in the LIDAR device 100, which is based on frequency measurements. Nonetheless, it would be possible to reduce or even entirely avoid power modulation of the optical frequency comb by modulating the pump laser source 110 and the microresonator 122 in unison or by operating the CWL 112 to be self-injection locked to modulation of the microresonator 122. In this case the laser-resonator detuning may be compensated by modulating both the pump laser light and the microresonator 122 in a coordinated manner, e.g., by modulating the microresonator 122 with the same modulation frequency, modulation type as the pump laser light, using a modulation amplitude which is set to achieve a desired degree of compensation. In this way, a change in relative resonator laser detuning can be compensated for. The separate tuning capability can for example be achieved by providing a piezo-electrical actuator on the photonic chip 121, whereby mechanical stress generated by the piezo-electrical actuator produces an optical frequency shift of the microresonator 122. In this way the amplitude modulation, and variation in the amplitude of the frequency modulation of the optical frequency comb can be been avoided. An example of a corresponding tuning mechanism is further explained in connection with FIGS. 15A and 15B.

Figure 6A:
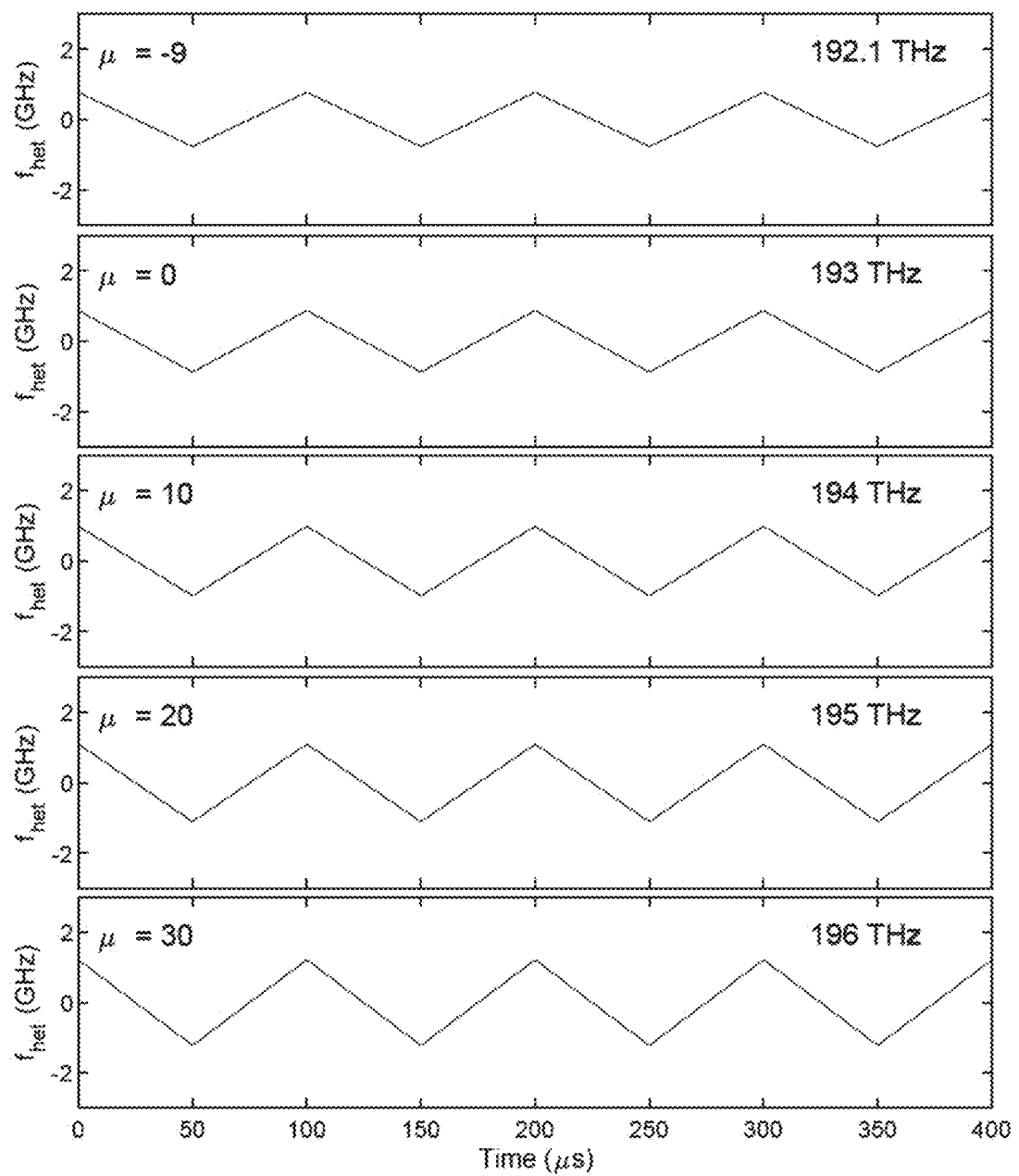
FIGS. 6A and 6B measured frequency modulation of individual comb teeth of an optical frequency comb as used in a LIDAR device according to an embodiment of the invention.
Figure 6B:
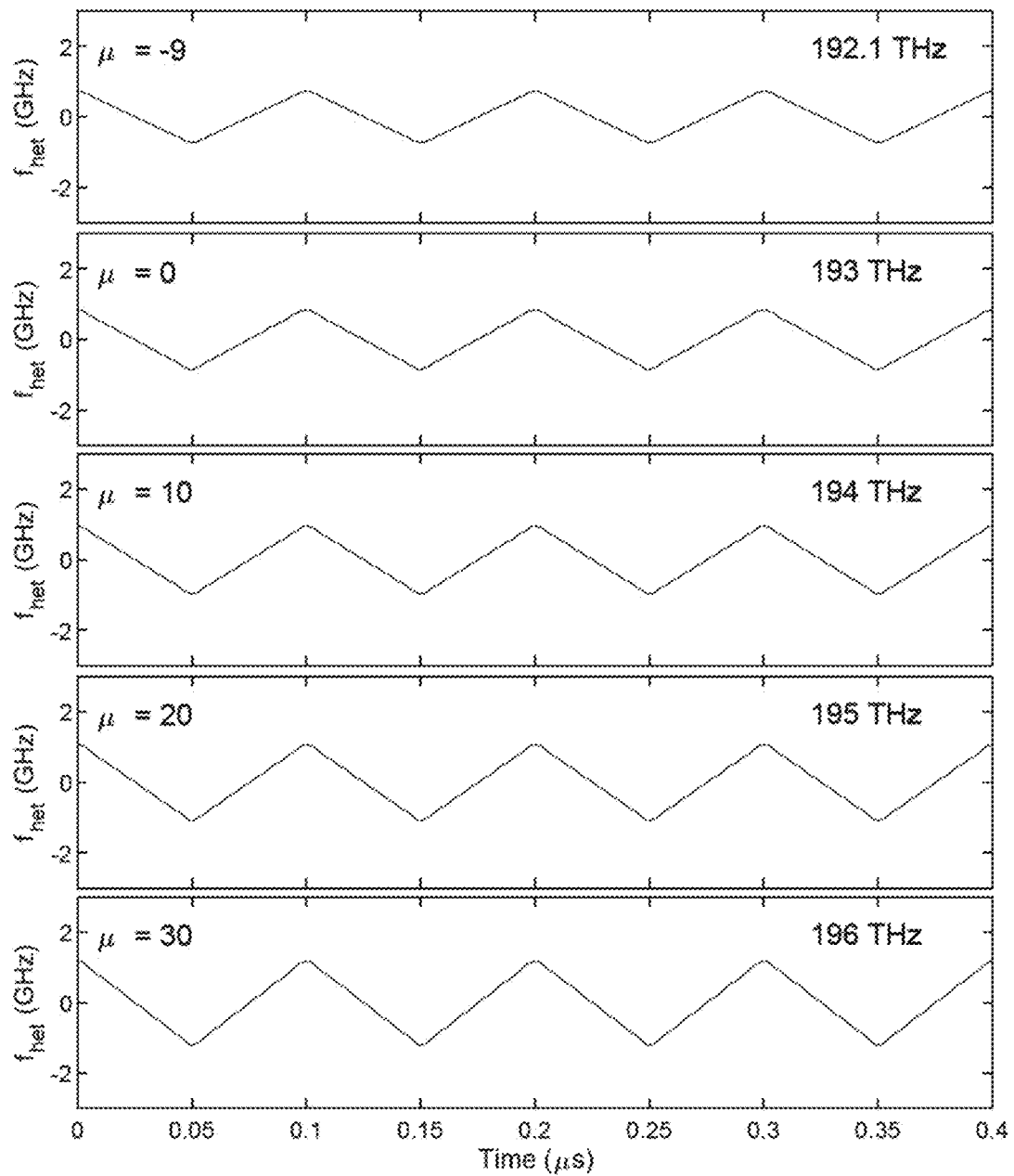
Figure 7A:
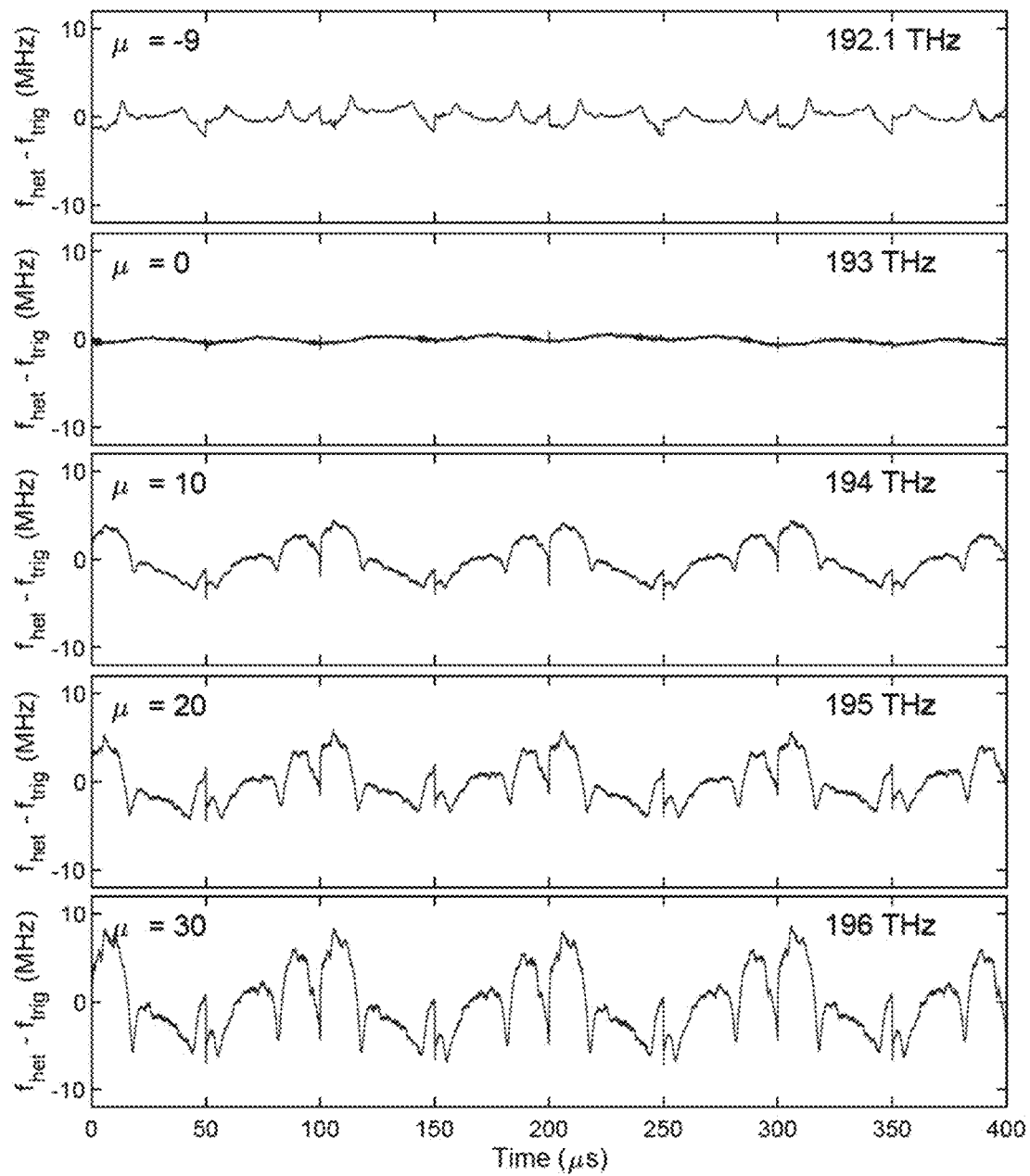
FIGS. 7A and 7B show measured non-linearities in frequency modulation of individual comb teeth of an optical frequency comb as used in a LIDAR device according to an embodiment of the invention.
Figure 7B:
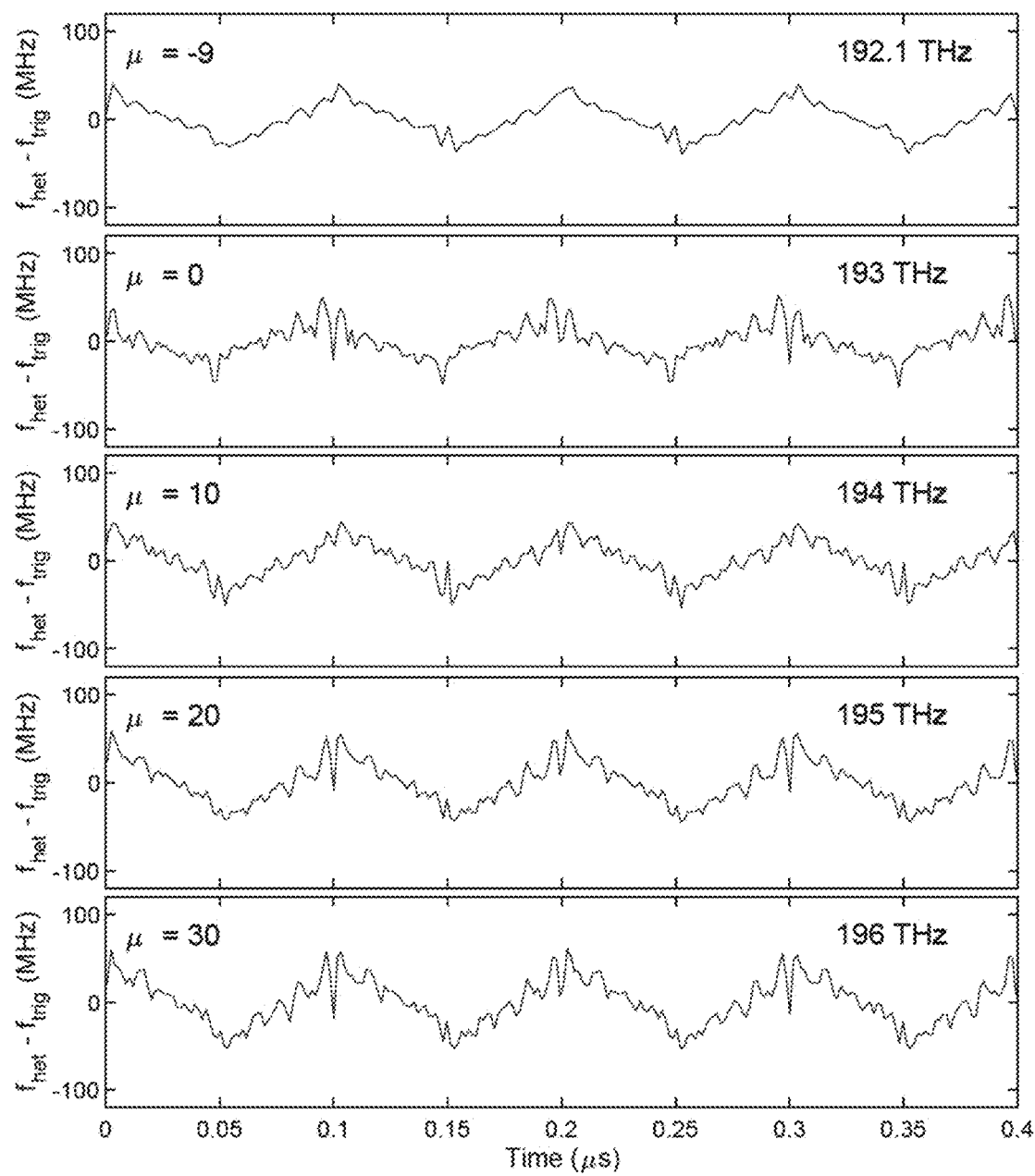

FIGS. 6A and 6B show exemplary measured characteristics of the frequency modulation for different comb teeth. FIG. 6A shows results of heterodyne measurements of the comb tooth frequency for a chirp frequency of 10 kHz, and FIG. 6B shows results of heterodyne measurements of the comb tooth frequency for a chirp frequency of 10 MHz. The heterodyne measurements are performed using reference laser light provided by a further CWL similar to the CWL 112, which is however not frequency modulated. FIGS. 7A and 7B show measured non-linearities for the chirp frequency of 10 kHz, the chirp frequency of 10 MHz, respectively. Here, the non-linearity was measured in terms of a deviation of the measured frequency from the frequency of an ideal symmetric triangular chirp waveform determined by least-squares fitting (denoted by $f_{trig}$). As can be seen, a high-quality chirp waveform is achieved for all comb teeth and for both low and high chirp frequencies.

Figure 8A:
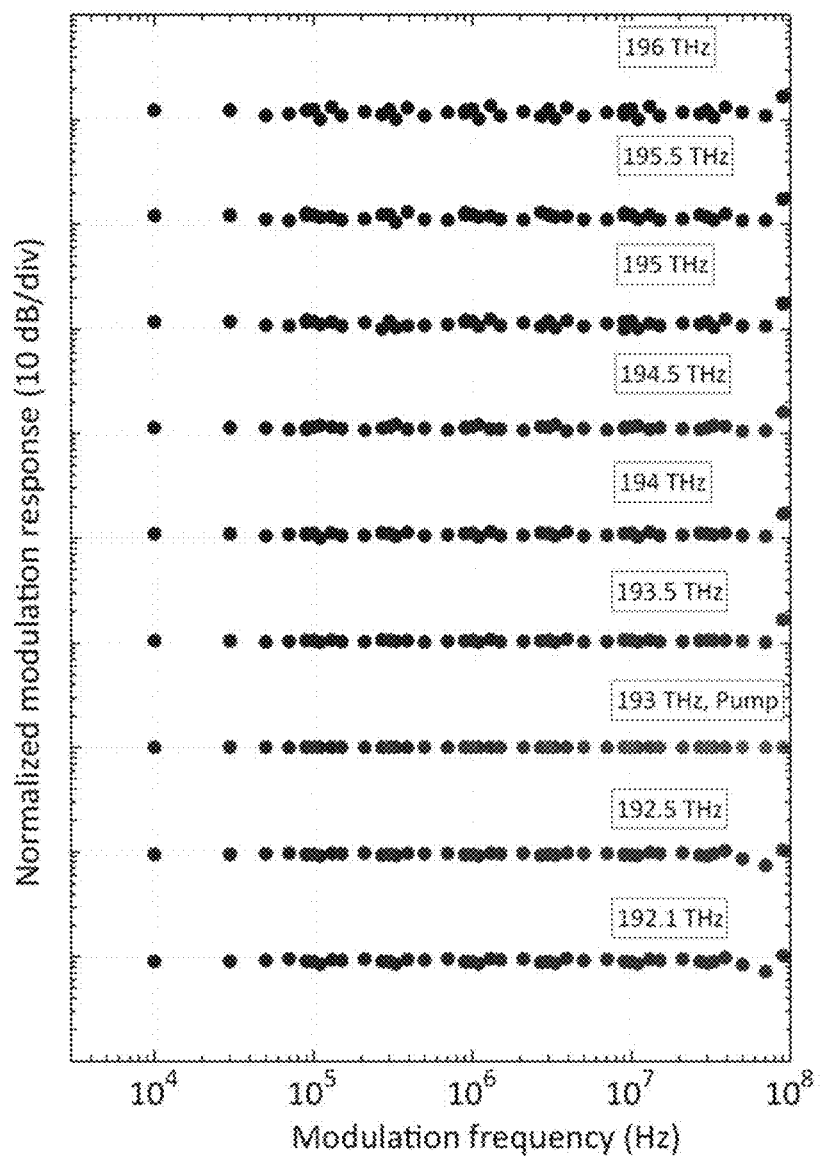
FIGS. 8A and 8B show measured characteristics of frequency modulation of an optical frequency comb as used in a LIDAR device according to an embodiment of the invention.
Figure 8B:
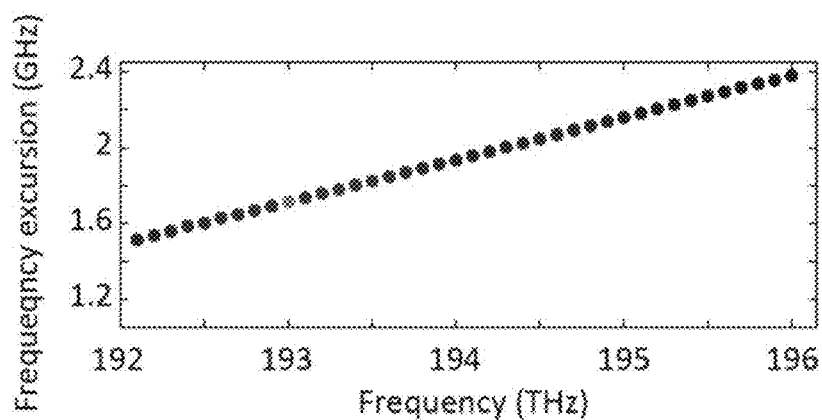

FIGS. 8A and 8B show measured modulation responses for different comb teeth. In FIG. 8A, the modulation responses are normalized with respect to the modulation amplitude of the pump laser light. The data corresponding to different comb teeth are vertically offset for a better overview. As can be seen from FIG. 8A, a dependence of the modulation response on the modulation frequency is negligible for modulation frequencies in the range of $10^4$ Hz to $10^8$ Hz. The data show a lower bound of 40 MHz for the 3 dB modulation cutoff, which corresponds to a maximum chirp frequency of $1.6 \cdot 10^{17}$ Hz². As can be seen from FIG. 8B, there is a slight linear increase of the frequency excursion with the channel frequency. This effect results from a dependence of the pulse repetition rate on the relative laser cavity detuning and is in agreement with numerical simulations including stimulated Raman scattering. A frequency-dependent non-linearity was found to be less than 1/500 of the full frequency excursion. The increase of the frequency excursion with the channel frequency can be taken into account by calibration of the LIDAR device 100, e.g., by determining a channel frequency-dependent scaling factor and adjusting the frequencies measured by the detector 150 by the scaling factor.

Figure 9A:
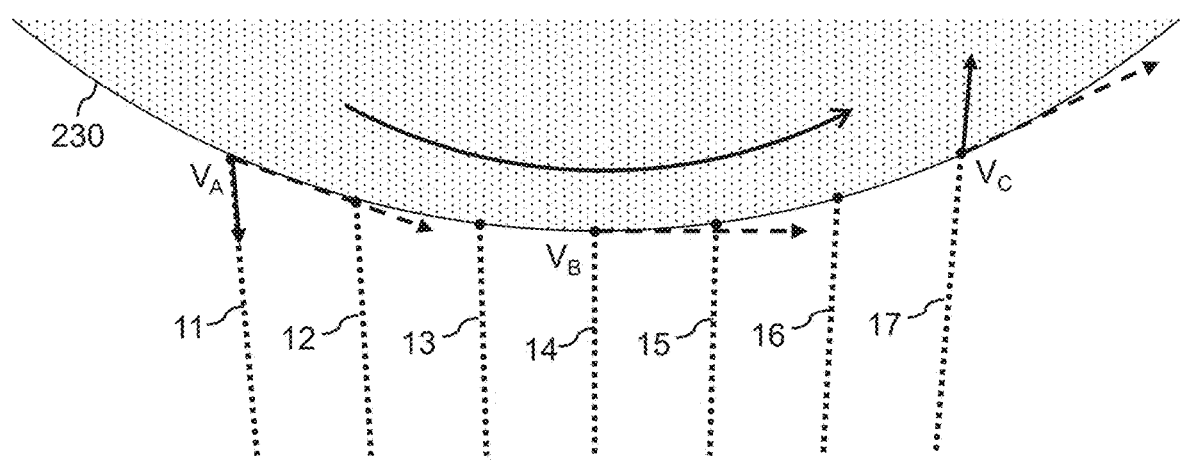
FIGS. 9A, 9B, and 9C show exemplary measurement results obtained by a LIDAR device according to an embodiment of the invention.
Figure 9B:
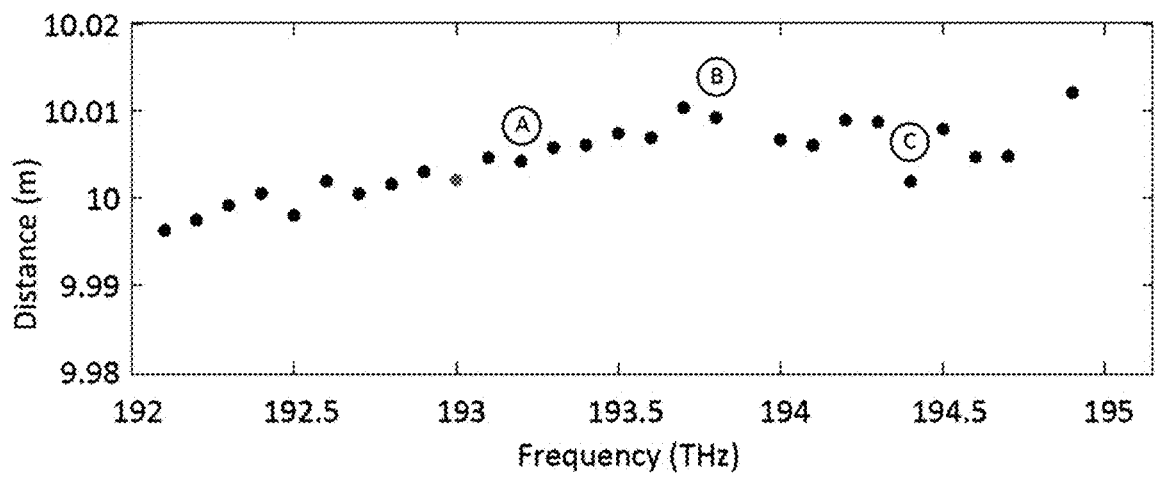
Figure 9C:
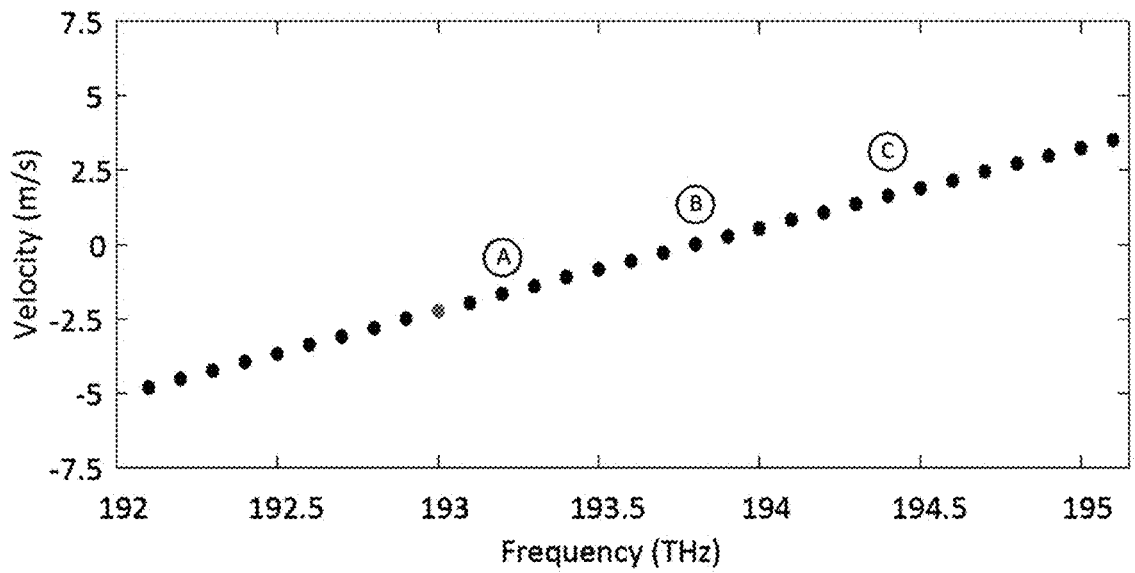

FIGS. 9A, 9B, 9C illustrate results obtained by using the LIDAR device 100 for distance and velocity in an exemplary scenario which involves measurements on a rotating flywheel 230, having a radius of 20 mm and placed 0.35 m from the diffractive element 140, in this example formed of a transmission grating with 966 lines/mm, with additional 9.65 m of fiber spool being added to the optical path, corresponding to an effective distance of 10 m from the LIDAR device 100 to the flywheel 230. FIG. 9A schematically illustrates the measurement setup. By way of example, FIG. 9A illustrates multiple beams 11, 12, 13, 14, 15, 16, 17 directed to different target positions on a circumferential surface of the flywheel. The beams 11, 12, 13, 14, 15, 16, 17 correspond to different comb teeth of the optical frequency comb generated by the NOE 120, i.e., to different frequency channels. By way of example, FIG. 9A also illustrates radial velocity components $v_A$, $v_B$, and $v_C$ for the beams 11, 14, and 17, respectively. The radial velocity components $v_A$, $v_B$, and $v_C$ are illustrated by solid arrows and correspond to a velocity component which is directed along the beam 11, 12, 13, 14, 15, 16, 17 impinging on the considered target position. Corresponding tangential velocity components, directed along the circumferential surface of the flywheel 230, are illustrated by broken arrows.

FIG. 9B shows the measured distances for 25 different frequency channels. The circles denoted by "A", "B", and "C" identify the data corresponding to the beams 11, 14, and 17. As can be seen, the measured distances are all with a range of 9.99 to 10.01 m, which matches the distance of the LIDAR device 100 and the flywheel 230 in the considered measurement setup. The average measurement imprecision over the 25 frequency channels is below 1 cm, which is comparable to conventional TOF based LIDAR systems. It is noted that the measurement accuracy could be further improved by using frequency chirps with a larger frequency excursion and avoiding chirp nonlinearity. FIG. 9C shows the measured velocities for the 25 different frequency channels while the flywheel 230 rotates at 228 Hz. Again, the circles denoted by "A", "B", and "C" identify the data corresponding to the beams 11, 14, and 17. As can be seen, the radial velocity component of the spinning wheel along its circumference is well resolved. The equivalent distance and velocity sampling rate of the frequency channels is 3 Ms/s.

Figure 10A:
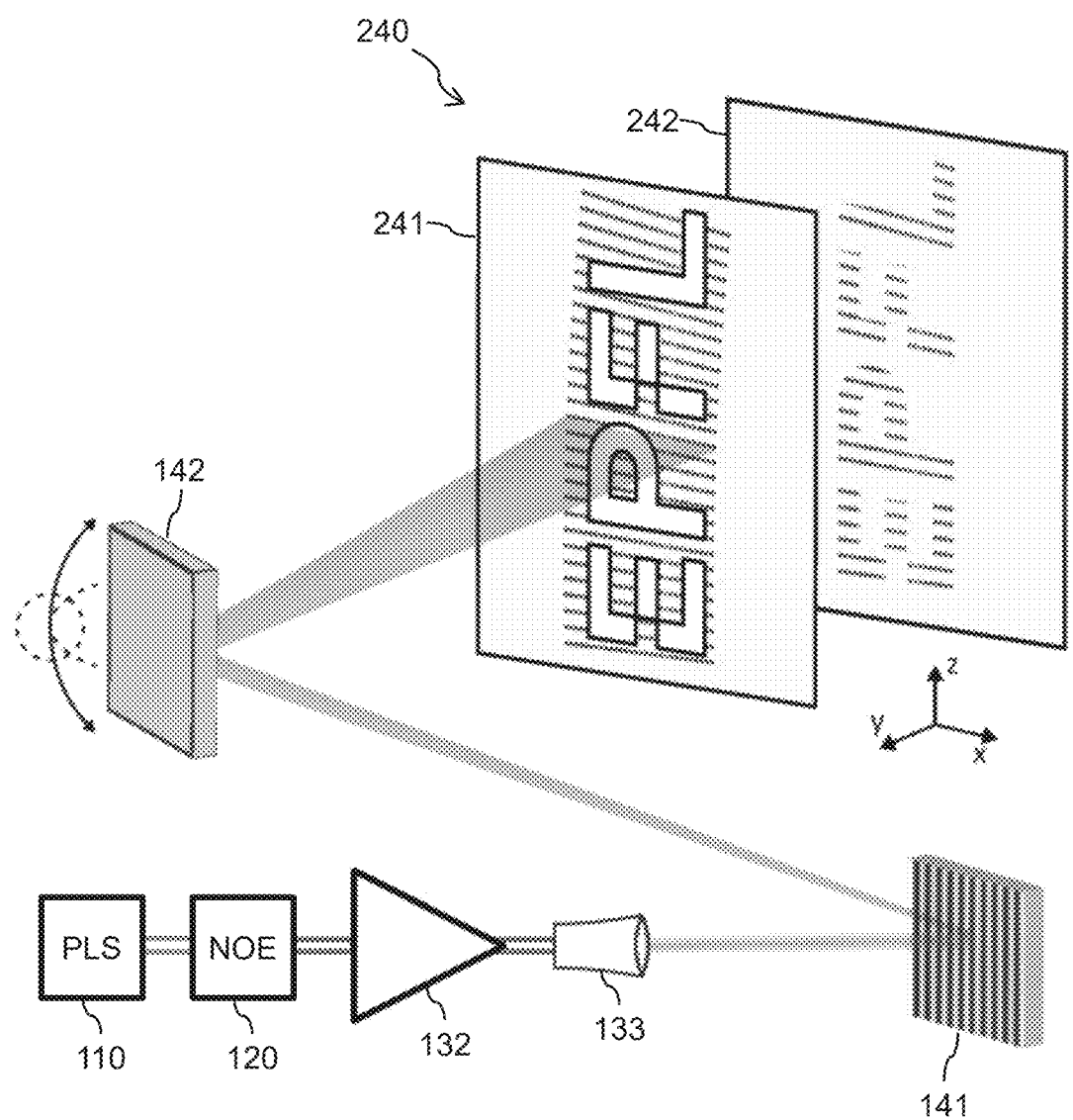
Figure 10B:
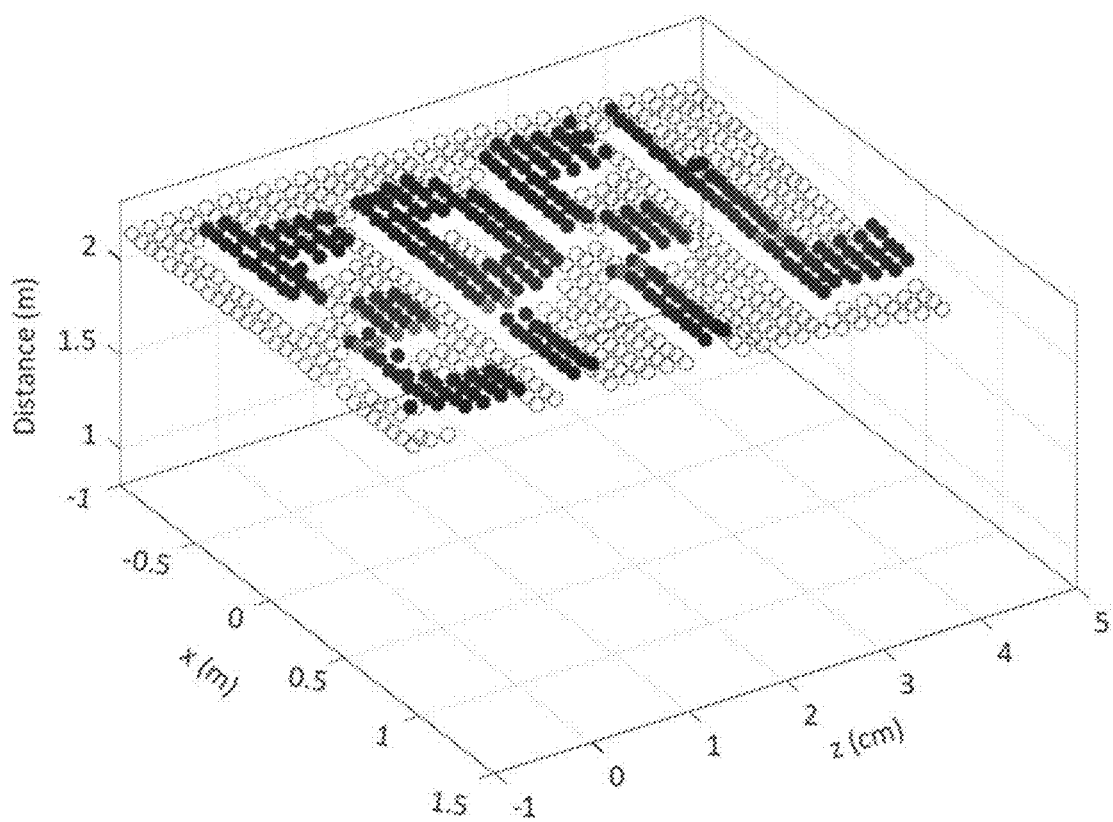
Figure 10C:
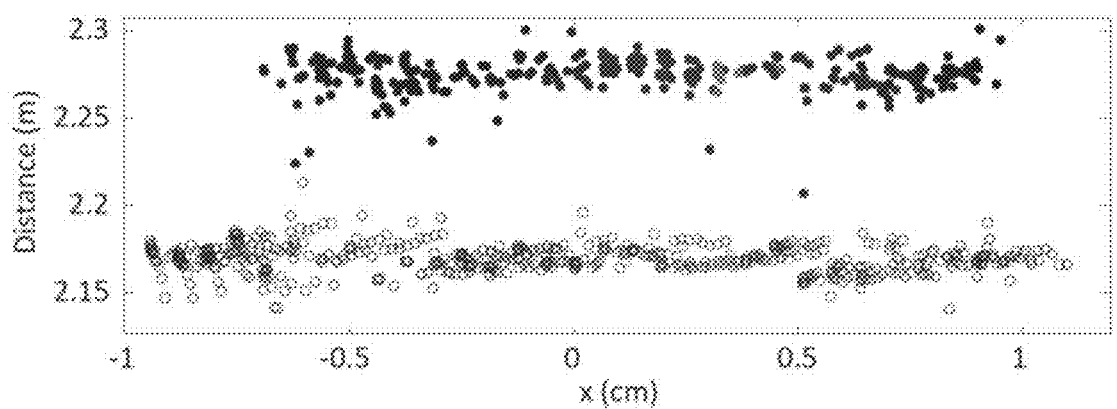

FIGS. 10A, 10B, 10C illustrate results obtained by using the LIDAR device 100 for 3D imaging on a sample object 240. In the illustrated example, the sample object 240 is formed of two sheets 241, 242 of white paper spaced by 11 cm, with an "EPFL" logo cutout in the front sheet. The sheet 241 is positioned at a distance of 2.1 m from the LIDAR device 100. FIG. 10A schematically illustrates the measurement setup.

As illustrated in FIG. 10A, the light of the optical frequency comb, generated by the pump laser source 110 and the NOE 120, is directed through a gain-flattened EDFA 132 and a collimator 133, to a diffractive grating 141, which spatially separates the light of the individual comb teeth.

In the illustrated example, the diffractive grating separates the light of the individual comb teeth along a first spatial axis, in FIG. 10A denoted by "y". The spatially separated light is then directed to a scanning mechanism 142. In the illustrated example, the scanning mechanism 142 is based on a 45° steering mirror, which sequentially scans the light in a second spatial direction, which different from the first spatial direction. In the illustrated example, the second spatial direction is denoted by "z". Due to being reflected by the steering mirror, the frequency dependent spatial separation of the light at the output of the scanning mechanism 142 is along a third spatial axis, denoted by "x". Accordingly, the spatial separation of the light introduced by the diffractive grating 141 allows for simultaneously performing measurements on different target positions which are spaced along the x-axis, while the scanning mechanism allows for sequentially performing measurements on different target positions which are spaced along the z-axis. The distance information from the measurements allows for resolving the location of the target positions along the y-axis. Accordingly, the measurement setup of FIG. 10A can be used for 3D imaging of the sample object 240.

FIGS. 10B and 100 illustrate the data measured in the setup of FIG. 10A. In FIG. 10B shows a 3D image representation. FIG. 100 shows the measured distances as a function of the x-coordinate, i.e., a projection of the data into the x-y plane. In FIGS. 10B and 100, target positions which are measured to be located in the plane of the sheet 242 are represented by solid circles. Open circles represent target positions which are measured to be located in the plane of the sheet 241. As can be seen, the planes of the two sheets 241, 242 are clearly separated due to the distance accuracy of the measurements.

In order to achieve precise and accurate distance measurements, a high quality frequency modulation of the optical frequency comb is desirable. For example when utilizing a chirp frequency modulation, high linearity of the chirp ramps is desirable. In the LIDAR device 100, quality of the frequency modulation of the optical frequency comb can be further improved by using a feedback loop to actively adjust the frequency modulation of the pump laser light. FIGS. 11A, 11B, 12A, and 12B illustrate adjustment mechanisms which may be used for this purpose.

Figure 11A:
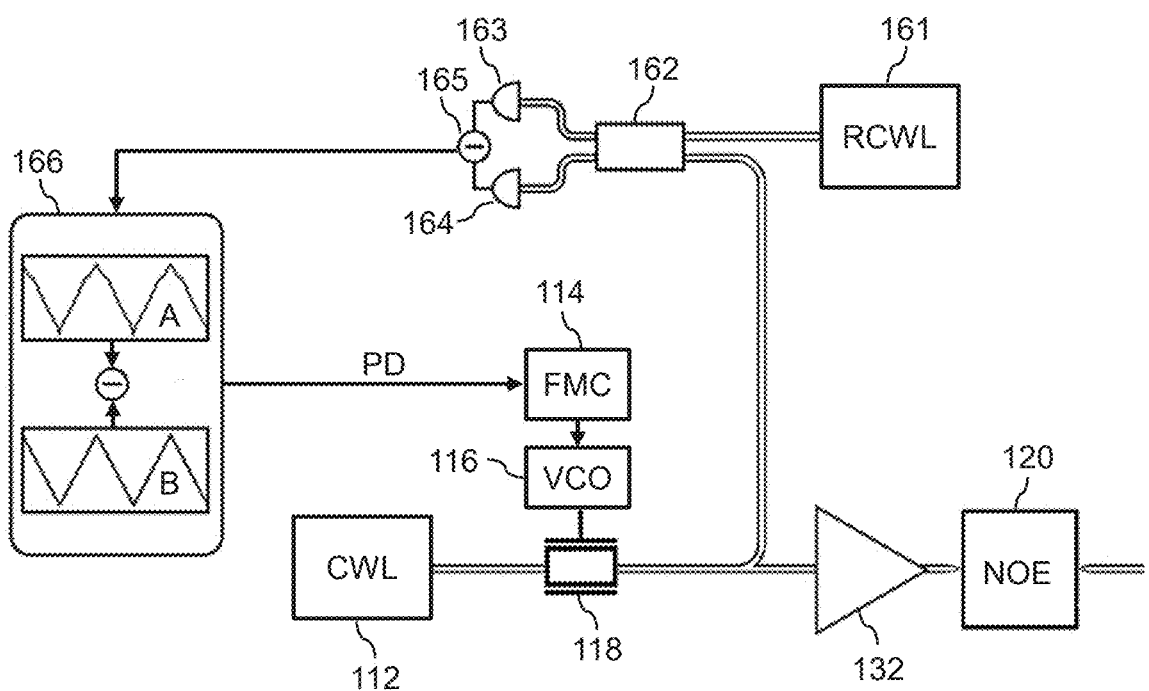
FIGS. 11A and 11B schematically illustrate an example for linearization of frequency modulation in a LIDAR device according to an embodiment of the invention.
Figure 11B:
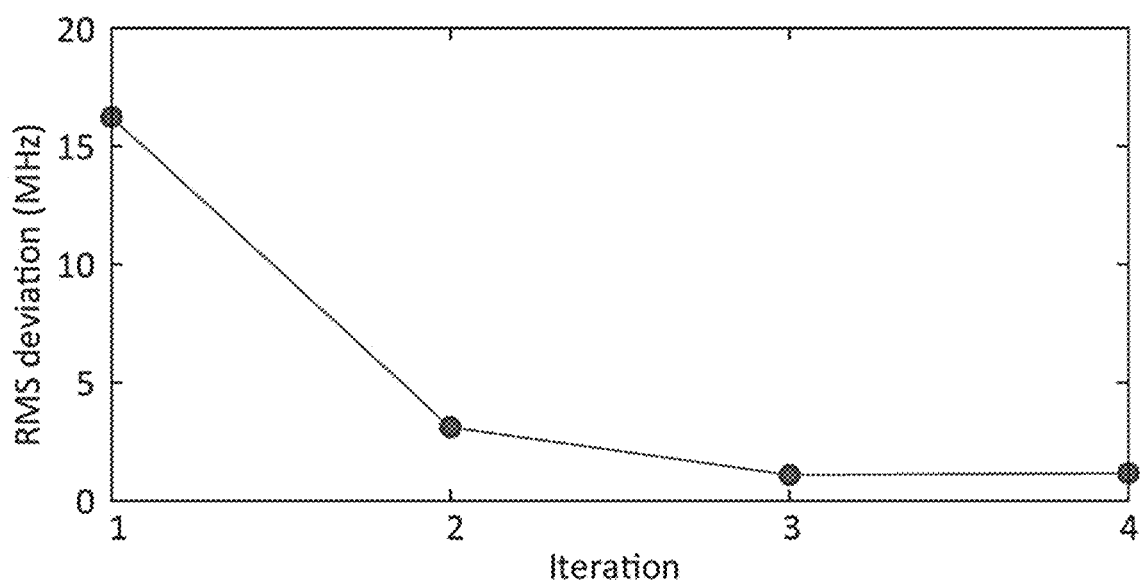

In the example of FIG. 11A, heterodyne detection of the frequency of the frequency-modulated pump laser light is used as a basis for detecting deviations of the frequency modulation from a desired waveform, and the FMC 114 is controlled depending on the detected deviations. As illustrated in FIG. 11A, the adjustment mechanism of this example includes a reference continuous wave laser (RCWL) 161, typically having the same characteristics as the continuous wave laser 112. The light from the RCWL 161 is provided to an optical coupler, in particular an optical splitter 162, e.g., having a splitting ratio of 50:50. Further, a part of the frequency modulated light pump laser light is provided to the optical splitter 162. Mixed output light from the optical splitter 162 is provided to photodetectors 163, 164 and subtractor 165, which provides a signal representing the actually measured frequency modulation of the pump laser light to an adjustment stage 166. The adjustment stage 166 determines the deviation of the actually measured frequency modulation, denoted by "A", from a desired waveform denoted by "B". Depending on the determined deviation, the adjustment stage 166 generates a predistortion signal PD which is used for controlling the FMC 114. Based on the predistortion signal PD, the FMC 114 adjusts generation of the control voltage supplied to the VCO 116. By means the predistortion, non-ideal characteristic of the VCO 114 and/or of the mixer 118 can be compensated, so that the actually measured frequency modulation pump laser light more closely matches the desired waveform of frequency modulation. The adjustment mechanism may be operated in an iterative manner by further adjusting the predistortion signal PD with each iteration. A relatively slow update rate of the feedback loop may be utilized, e.g., in the range of 10 Hz, which is typically sufficient to compensate for laser frequency drifts or other deviations occurring during operation of the LIDAR device 100. FIG. 11B shows the deviations of the actually measured frequency modulation from a desired waveform over the course of several iterative operations of the adjustment mechanism. As can be seen, the deviations can be efficiently reduced to a level of about 1 MHz.

Figure 12A:
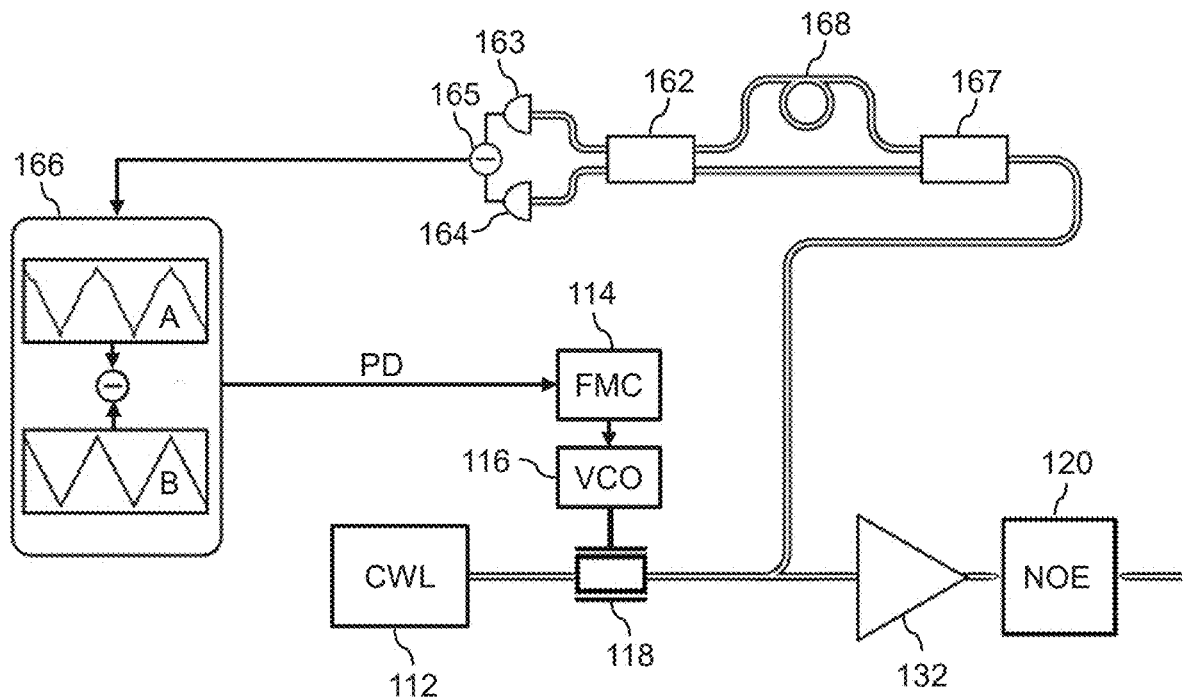
FIGS. 12A and 12B schematically illustrate a further example for linearization of frequency modulation in a LIDAR device according to an embodiment of the invention.
Figure 12B:
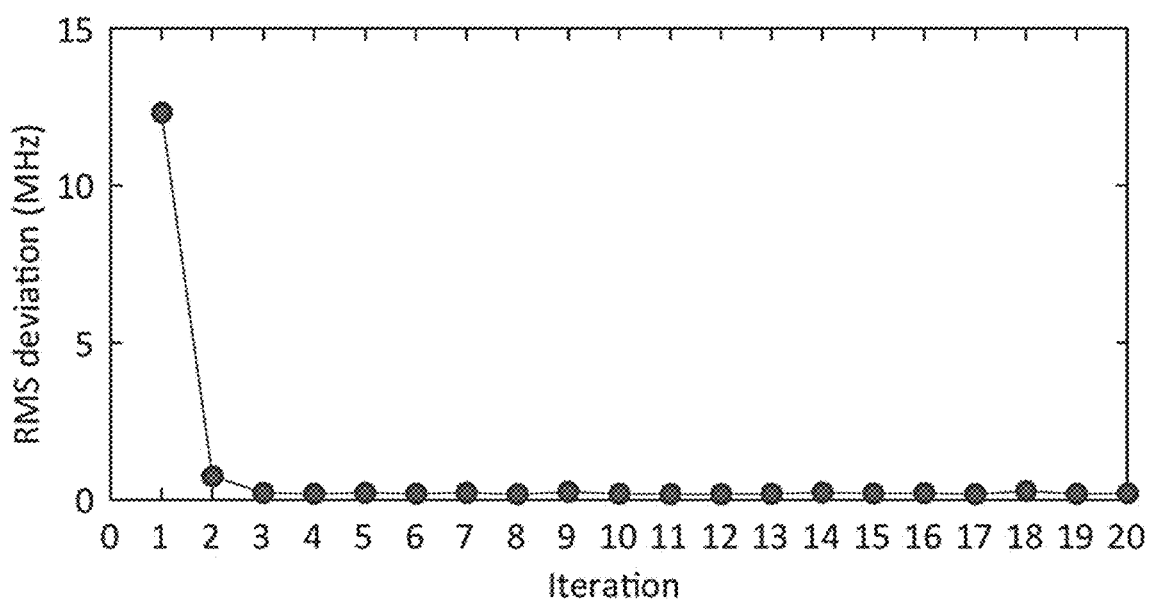

In the example of FIG. 12A, delayed homodyne detection in an imbalanced Mach-Zehnder interferometer (MZI) arrangement is used as a basis for detecting deviations of the frequency modulation from a desired waveform, and the FMC 114 is controlled depending on the detected deviations. As illustrated in FIG. 12A, the adjustment mechanism of this example includes a beam splitter 167, e.g., having a splitting ratio of 50:50, a delay fiber spool 168, e.g., corresponding to a fiber length of about 10 m, and a optical splitter 162, e.g., having a mixing ratio of 50:50. A part of the frequency modulated light pump laser light is provided to the beam splitter 167. One part of the light output from the beam splitter 167 is provided directly to the optical splitter 162, while the other part of the light output from the beam splitter 167 is provided via the delay fiber loop 168 to the optical splitter 162. The optical splitter 162 thus mixes the frequency modulated pump laser light with a delayed version of the of the frequency modulated pump laser light. Mixed output light from the mixer 162 is provided to photodetectors 163, 164 and subtractor 165, which provides a signal representing the actually measured frequency modulation of the pump laser light to an adjustment stage 166. The adjustment stage 166 determines the deviation of the actually measured frequency modulation, denoted by "A", from a desired waveform denoted by "B". Depending on the determined deviation, the adjustment stage 166 generates a predistortion signal PD which is used for controlling the FMC 114. Based on the predistortion signal PD, the FMC 114 adjusts generation of the control voltage supplied to the VCO 116. By means the predistortion, non-ideal characteristic of the VCO 114 and/or of the mixer 118 can be compensated, so that the actually measured frequency modulation pump laser light more closely matches the desired waveform of frequency modulation. The adjustment mechanism may be operated in an iterative manner by further adjusting the predistortion signal PD with each iteration. A relatively slow update rate of the feedback loop may be utilized, e.g., in the range of 10 Hz, which is typically sufficient to compensate for the drifts or other deviations occurring during operation of the LIDAR device 100. FIG. 12B shows the deviations of the actually measured frequency modulation from a desired waveform over the course of several iterative operations of the adjustment mechanism. As can be seen, the deviations can be efficiently reduced to a level of even below 1 MHz.

Figure 13A:
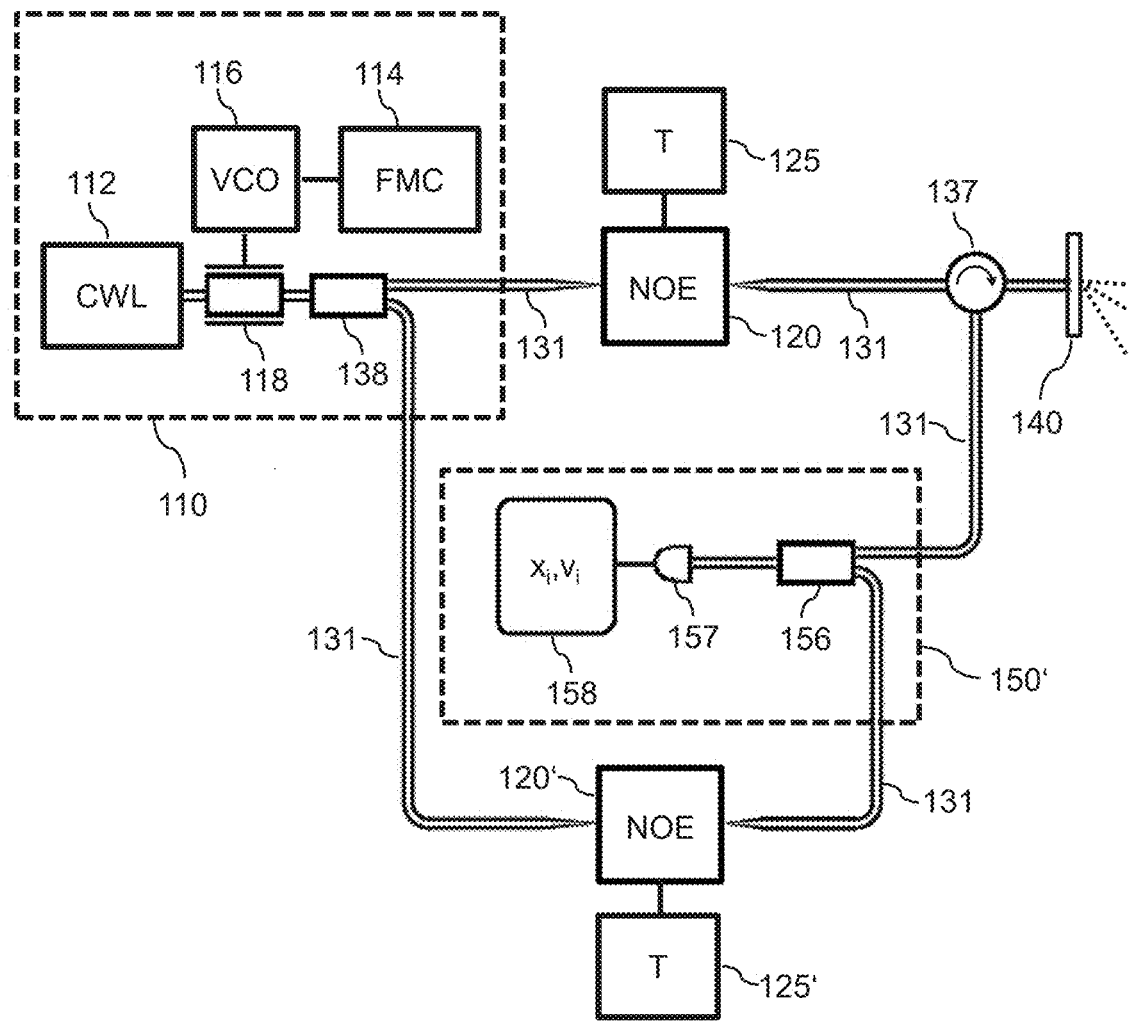
FIGS. 13A, 13B, and 13C schematically illustrate examples of a heterodyne detector as used in a LIDAR device according to an embodiment of the invention.

In the above examples, it was assumed that the detector 150 uses homodyne detection of the frequency modulation in the reflected light from the ranging region 200 as a basis for performing the distance and velocity measurements. FIG. 13A schematically illustrates an alternative implementation of a detector 150', which is based on heterodyne detection of the frequency modulation in the reflected light from the ranging region 200, using an additional optical frequency comb as a local oscillator. In FIG. 13A, components which are similar to those of FIG. 1 have been designated with the same reference numerals, and for details concerning these components, reference is made to the corresponding description in connection with FIG. 1.

In the example of FIG. 13A, an additional beam splitter 138, e.g., having a splitting ratio of 50:50, is provided at the output of the modulator 118. One part of the light from the splitter 138 is provided to the NOE 120, like in the example of FIG. 1. Another part of the light from the splitter 138 is provided to an additional NOE 120'. In alternative variants, a separate modulator could be provided for modulating the light provided to the additional NOE 120'. i.e., the splitter 138 could be provided between the CWL 112 and the modulator 118, and an additional modulator, controlled in a similar manner as the modulator 118, could be provided between the splitter 128 and the additional NOE 120'. Still further, the additional NOE 120' could be provided with unmodulated light from the CWL 112 as input, i.e., the splitter 138 could be provided between the CWL 112 and the modulator 118 and the light from the splitter 138 provided to the additional NOE 120' without being subjected to any modulation.

In the example of FIG. 13A, the additional NOE 120' generates a further optical frequency comb which is similar to the optical frequency comb generated by the NOE 120, but has a spacing of the comb teeth which is slightly offset by a value $\Delta f_{rep}$. The offset may be set with the aim of obtaining sufficiently large guard bands to account for the fastest and most distant objects to be detected by the LIDAR system 100 and may be in the range of 100 MHz to 1 GHz. The additional NOE 120' typically has the same characteristics as the NOE 120, e.g., as explained in connection with FIGS. 4, 5A, and 5B. Similar as the NOE 120, the additional NOE 120' may be implemented by a microresonator formed on a photonic chip. In some scenarios, the NOE 120 and the additional NOE 120' may be formed on the same photonic chip. In the following, the reflected light of the optical frequency comb generated by the NOE 120 will also be referred to as signal comb, and the further optical frequency comb generated by the additional NOE 120' will be referred to as local oscillator comb.

Figure 13B:
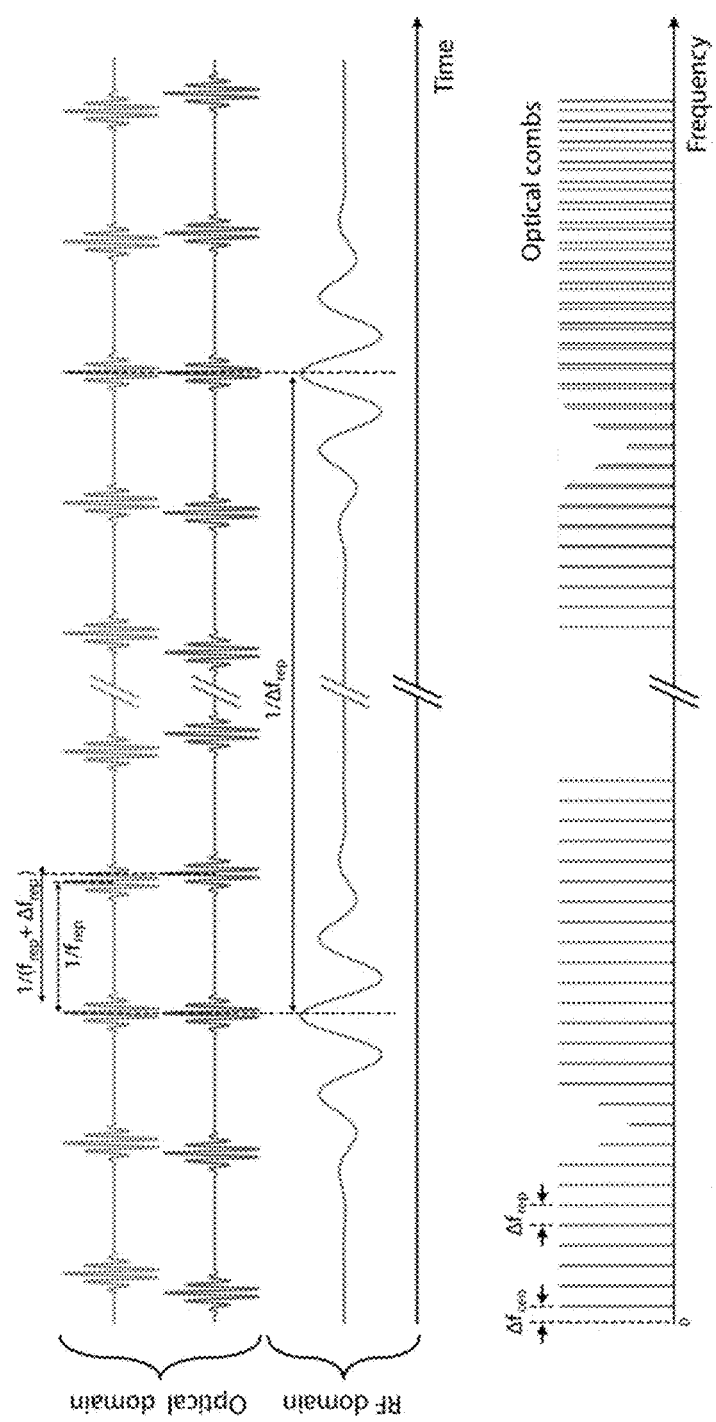

In the example of FIG. 13A, the detector 150' includes a mixer 156, e.g., having a mixing ratio of 50:50, which mixes the signal comb with the local oscillator comb. Due to the mixing, light at the output of the mixer 156 exhibits a beat note for each pair of corresponding comb teeth from the two optical frequency combs. As illustrated in FIG. 13B, these beat nodes occur in the radio frequency range, and may therefore also be referred to as "radio frequency multiheterodyne". The beat notes are detected by a broadband photodetector 157, digitized, and evaluated by a measurement logic 158. Similar as in the homodyne detection by the detector 150, each beat note generally exhibits two beat note frequencies $f_{u,\mu}$, $f_{d,\mu}$ for the corresponding target position, which allow for calculating the distance and/or velocity, as further explained in connection with FIGS. 14A and 14B.

Figure 13C:
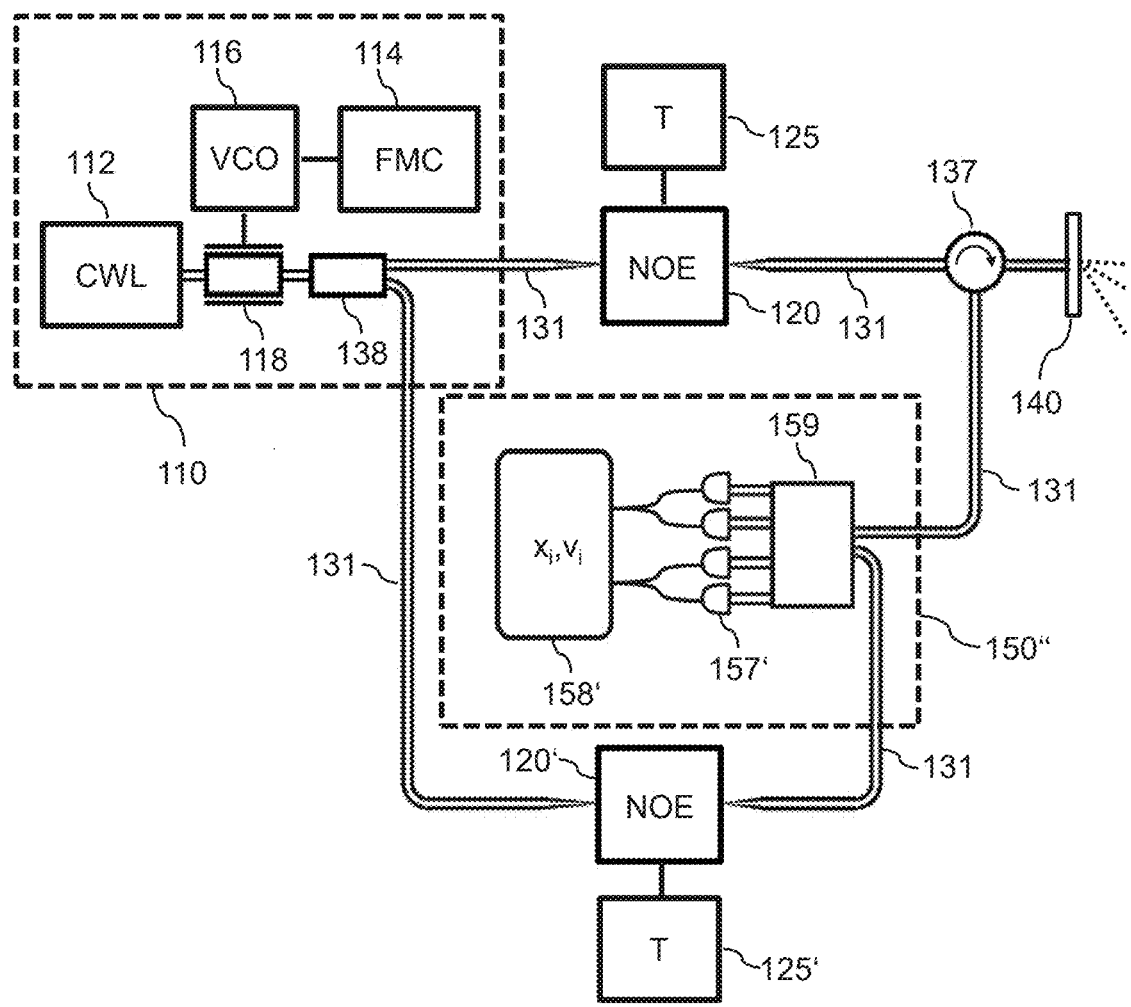

FIG. 13C schematically illustrates a further alternative implementation of a detector 150", which is based on heterodyne detection of the frequency modulation in the reflected light from the ranging region 200, using an additional optical frequency comb as a local oscillator. In FIG. 13C, components which are similar to those of FIGS. 1 and 13A have been designated with the same reference numerals, and for details concerning these components, reference is made to the corresponding description in connection with FIG. 1 and FIG. 13A.

In the variant of FIG. 13C, the detector 150" includes an optical hybrid coupler 159, in particular a 90° optical hybrid coupler, which performs mixing of the signal comb with the local oscillator in the complex-field space. The optical hybrid coupler 159 separates in-phase and quadrature components of beat notes caused by the mixing of the signal comb with the local oscillator comb. The in-phase and quadrature components are detected by a pair of balanced broadband photodetectors 157", digitized, and evaluated by a measurement logic 158'. Similar as in the homodyne detection by the detector 150", each beat note generally exhibits two beat note frequencies $f_{u,\mu}$, $f_{d,\mu}$ for the corresponding target position, which allow for calculating the distance and/or velocity, as further explained in connection with FIGS. 14A and 14B. Here, the evaluation of the in-phase and quadrature components allows for distinguishing positive frequencies, i.e., channels where the signal comb tooth has a higher frequency than the corresponding local oscillator comb tooth, from negative frequencies, i.e., channels where the signal comb tooth has a lower frequency than the corresponding local oscillator comb tooth.

Figure 14A:
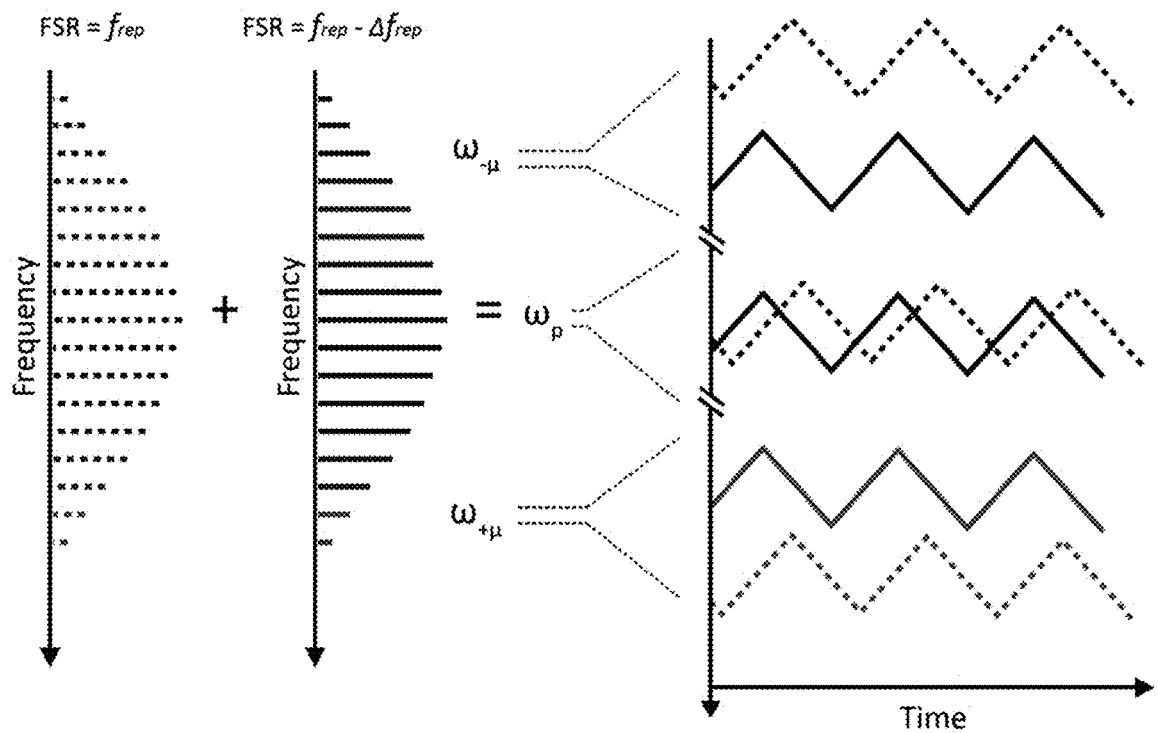
FIGS. 14A and 14B schematically illustrate homodyne detection of distance and velocity as used in a LIDAR device according to an embodiment of the invention.
Figure 14B:
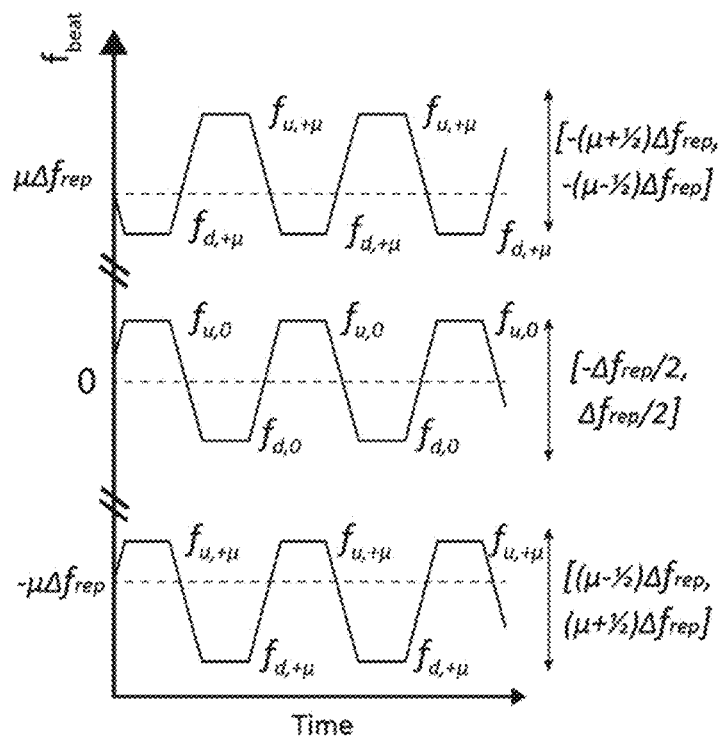

The principle underlying the measurements of distance and velocity based on the heterodyne detection of frequency modulation of the reflected light is illustrated in FIGS. 14A and 14B, where solid signal traces illustrate the frequency modulated light of the local oscillator comb and broken signal traces illustrate the frequency modulated signal comb. FIG. 14A illustrates the signals in the optical domain, and FIG. 14B illustrates the signals in the radio frequency domain, in particular the detected beat frequencies f beat. As can be seen from FIG. 14B, the offset $\Delta f_{rep}$ in the spacing of the comb teeth between the signal comb and the local oscillator comb results in the individual channels corresponding to the different target positions being spectrally separated in the radio frequency domain by $\mu \cdot \Delta f_{rep}$, where $\mu=0$ denotes the spectral channel of the pump laser light.

As can be seen from the examples of FIGS. 13A and 13C, in some variants the LIDAR system 100 may use a dual-comb detection scheme, which is based on using only a single high-bandwidth photodetector for detecting the frequency modulation of multiple comb teeth. In this case, spectral demultiplexing, e.g., like by the demultiplexer 152 of FIG. 1, and spectral filtering can be avoided. In the dual-comb detection scheme, the further optical frequency comb serves as a local oscillator and is mixed with the reflected light of the signal comb. This may be accomplished by either using a simple optical coupler with 50/50 power splitting ratio, such as the optical splitter 138 of FIG. 13A, or by using a 90° optical hybrid coupler, such as the optical hybrid coupler of FIG. 13C. The latter variant has the advantage of enabling detection of both in-phase and quadrature signal components, so that the positive frequencies can be distinguished from the negative frequencies and ambiguities thus avoided. Otherwise, such ambiguities from symmetrically spaced comb channels could be avoided either by frequency shifting the pump laser light either for the signal or local oscillator paths, e.g., by using a acousto-optical modulator or a dual Mach-Zehnder modulator biased to SSB, or by spectral filtering of the channels with optical frequencies higher or lower than the frequency of the pump laser light.

When again assuming a chirp modulation using frequency modulation according to a triangular waveform around a center frequency $f_c$ with a modulation period T and frequency excursion of B, the distance of the target position µ can be calculated from the signals detected by the optical hybrid coupler according to $$x_\mu = \frac{cT}{4B} \frac{f_{u,\mu} - f_{d,\mu}}{2}, \tag{3}$$

and the velocity at the target position µ can be calculated according to $$v_\mu = \frac{c}{2f_c\cos\theta_\mu} \frac{f_{u,\mu} + f_{d,\mu}}{2} - \mu\Delta f_{rep}, \tag{4}$$

where $\theta_\mu$ denotes an angle of the light beam relative to a movement direction of a moving object at the target position µ.

Figure 15A:
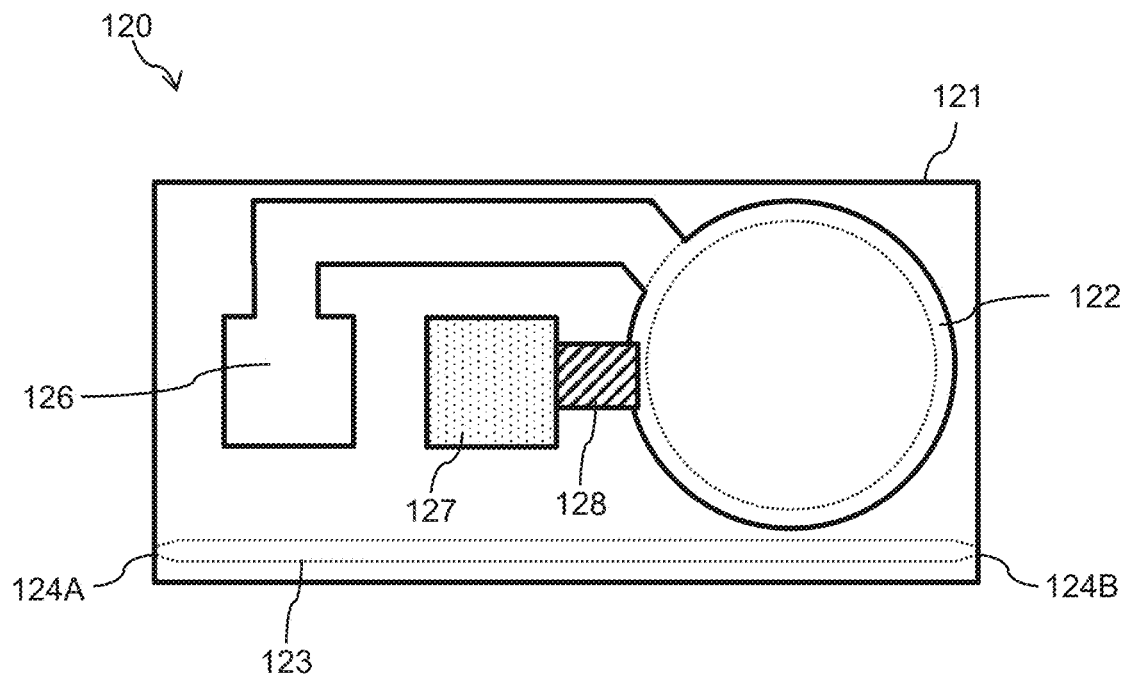
FIGS. 15A and 15B schematically illustrate a tuning mechanism and tuning approach as used in a LIDAR device according to an embodiment of the invention.
Figure 15B:
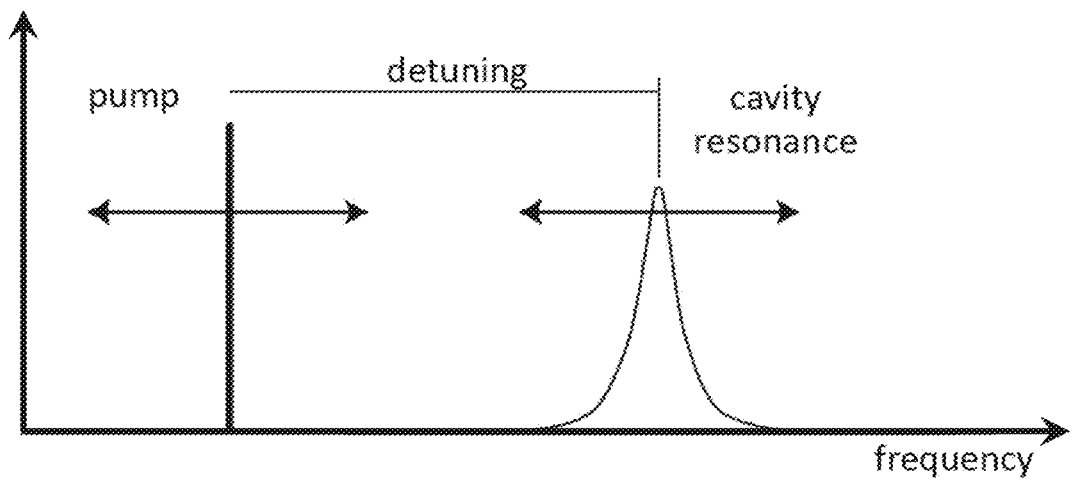

FIGS. 15A and 15B further illustrate an example of tuning of the NOE 120. FIG. 15A illustrates structures of the NOE 120, which enable tuning the characteristics of the NOE 120 with respect to generation of the optical frequency comb. In the example of FIG. 15A the NOE 120 is provided with a piezo-electric actuator which allows for tuning the resonance of the microresonator 122. In the example of FIG. 15A, the NOE 120 is assumed to be implemented on the basis of a microresonator 122 formed in a photonic chip 121, as already explained in connection with FIG. 4.

FIG. 15A illustrates structures formed on the photonic chip 121 for implanting the piezo-electric actuator. These structures include a first electrode 126, a second electrode 127, and an actuator element 128 connected between the first electrode 126 and the second electrode 127. In the illustrated example, the first electrode is formed of aluminum (Al), the second electrode is formed of molybdenum (Mo), and the actuator element is formed of polycrystalline aluminum nitride (AlN). As further shown, the first electrode 126 substantially covers a chip area of the microresonator, whereas the second electrode 127 and the actuator element 128 are arranged adjacent to this chip area. The electrodes 126, 127 and the actuator element 128 may be formed by using various thin-film technology technologies, e.g., physical vapor deposition (PVD) and patterning based on photolithography, dry etching, and lift-off techniques.

By applying a voltage between first electrode 126 and the second electrode 127, a piezo-electric effect is induced in the actuator element 128, which in turn induces stress in the material of the photonic chip 121, which in the illustrated example is based on $Si_3N_4$. The stress influences the resonance frequency of the microresonator 122, which allows for tuning the resonance frequency by the voltage applied to the electrodes 126, 127. Experiments show that the resonance frequency can be tuned with a slope of about 16 MHz/V, high linearity and low hysteresis. Further, it is noted that the resonance frequency can be tuned in a bi-directional manner, depending on the sign of the applied voltage.

In the LIDAR device 100, the voltage-based tuning of the resonance frequency of the microresonator 122 may be used for efficiently and precisely tuning the NOE 120 into the existence range of the DKS. As a result, tuning of the frequency of the CWL 112 may not be required to generate the DKS and the optical frequency comb. The voltage for tuning the NOE 120 may be generated by the above-mentioned tuning stage 125.

Further, the voltage-based tuning of the resonance frequency of the microresonator 122 may be used for compensating effects arising from the frequency modulation of the pump laser light. As a general rule, the frequency modulation of the pump laser light may also affect the relative detuning of the resonance frequency of the microresonator 122 with respect to the frequency of the pump laser light. Accordingly, the frequency modulation of the pump laser light is configured to ensure that the excursion of the frequency modulation does not result in a value of the relative detuning which is outside the range of existence of the DKS, as for example illustrated in FIG. 5A. By also subjecting the voltage for tuning the resonance frequency of the microresonator 122 to a frequency modulation which is coordinated with the frequency modulation of the pump laser light, it is possible to shift the resonance frequency of the microresonator 122 synchronously with the frequency of the pump laser light, as schematically illustrated in FIG. 15B. The illustrated tuning mechanism allows for quick response times of the microresonator 122 to changes of the applied voltage, e.g., corresponding to a tuning bandwidth of more than 2 GHz and modulation frequencies beyond 17 MHz.

With the tuning mechanism of the illustrated example, the voltage for tuning the resonance frequency of the microresonator 122 may be modulated with the same modulation frequency and with the same or at least a similar modulation waveform as the pump laser light. In this way, variations of the relative detuning can be reduced. In some scenarios, parameters of the frequency modulation of the voltage for tuning of the resonance frequency of the microresonator 122, e.g., modulation amplitude and modulation waveform, can be set to fully compensate the effects of the frequency modulation of the pump laser light, so that the relative detuning is kept substantially constant. In other cases, the effects of the frequency modulation of the pump laser light may be compensated only partially. In each case, the maximum possible excursion of the frequency modulation of the pump laser light and thus also the maximum possible excursion of the frequency modulation of the optical frequency comb generated by the NOE 120 can be enhanced, which may help to achieve a better measurement accuracy of the LIDAR system 100. Further, compensation of the effects of the frequency modulation of the pump laser light in the optical frequency comb may also be used to reduce or avoid amplitude modulation and other variations in the amplitude of the frequency modulation of the optical frequency comb, which in turn may help to achieve a better measurement accuracy of the LIDAR system 100.

It is noted that the compensation scheme as explained in connection with FIGS. 15A and 15B could also be applied in connection with other types of piezo-electric actuators, e.g., using other materials and/or other geometries of electrodes and actuator elements. Further, the compensation scheme could also be applied in connection with other types of tuning mechanisms which allow for tuning the resonance frequency of the microresonator in a sufficiently quick and precise manner. Such other types of tuning mechanisms may for example be based on electro-optical tuning, where a material with a second-order nonlinearity such as AlN, or lithium niobate ($LiNbO_3$) composes the microresonator, or is applied to the microresonator such that the optical field of the microresonator mode penetrates the additional nonlinear material. Further, it is noted that similar tuning may also be performed with respect to any additional NOE used in the LIDAR device 100, such as the above-mentioned additional NOE 120'.

Figure 16:
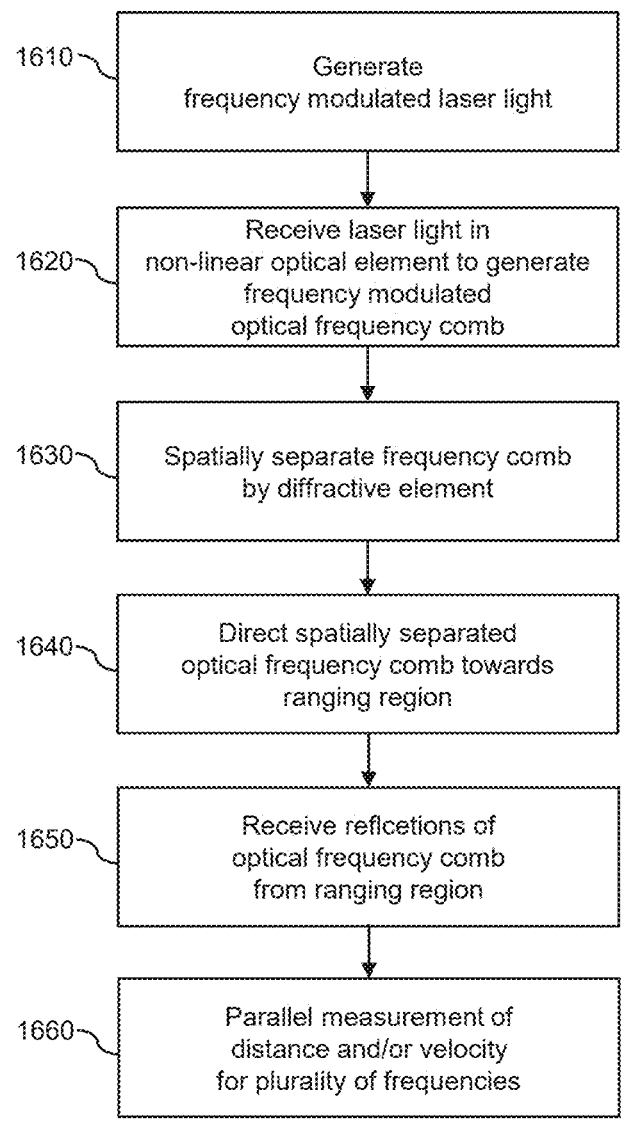
FIG. 16 shows a flowchart for schematically illustrating a LIDAR method according to an embodiment of the invention.

FIG. 16 shows a flowchart for schematically illustrating a LIDAR method which may be used for implementing the concepts as illustrated above. For example, the method of FIG. 15 could be performed by the above-mentioned LIDAR device.

At step 1610, first laser light is generated. The first laser light has a first frequency modulation. The first frequency modulation may for example correspond to a frequency chirp, i.e., to frequency modulation according to a triangular waveform. However, other types of frequency modulation could be used as well, e.g., based on a sigmoidal waveform or a frequency shift keying modulation. The first laser light may for example be generated by the above-mentioned pump laser source 110.

In some scenarios, the first frequency modulation is controlled by a control signal, such as the above-mentioned control voltage supplied to the VCO 116. In such cases, quality of frequency modulation may be improved by measuring a deviation of the first frequency modulation from a desired modulation waveform and adjusting the control signal depending on the measured deviation, e.g., as explained in connection with FIGS. 11A, 11B, 12A, and 12B.

At step 1620, the first laser light is received in a non-linear optical element, e.g., the above-mentioned NOE 120, to generate second laser light from the first laser light. The non-linear optical element may have a second order non-linear characteristic and/or a third order non-linear characteristic. The second laser light has a comb-like frequency spectrum with a plurality of second laser frequencies. The second laser light is thus also referred to as optical frequency comb. The second laser frequencies are each frequency modulated with a second frequency modulation. The second frequency modulation is defined by the first frequency modulation. A frequency excursion of the second frequency modulation is smaller than a spacing of the second laser frequencies. The second laser frequencies may include a laser frequency of the first laser light. Similar to the first frequency modulation, the second frequency modulation may for example correspond to a frequency chirp, i.e., to frequency modulation according to a triangular waveform. However, other types of frequency modulation could be used as well, e.g., based on a sigmoidal waveform or a frequency shift keying modulation.

The non-linear optical element may include at least one photonic resonator, such as the above-mentioned microresonator 122. In some scenarios, the non-linear optical element may generate the second laser light based on pumping a DKS in the photonic resonator by the first laser light, e.g., as explained in connection with FIGS. 4, 5A, and 5B. A frequency excursion of the first frequency modulation may be within a frequency range selected to support stable generation of the DKS.

In some scenarios, tuning of the photonic resonator may be modulated depending on the first frequency modulation, e.g., as explained in connection with FIGS. 15A and 15B. This may be used for compensating effects of the first frequency modulation on the generation and/or the frequency modulation of the second laser light, e.g., by allowing wider frequency excursion of the first frequency modulation without leaving the range supporting stable generation of the DKS and/or by avoiding amplitude modulation or other amplitude variations of the frequency modulation of the second laser light.

The second frequency modulation may be a linear function of the first frequency modulation. For example as discussed in connection with FIGS. 8A and 8B, a modulation response of the second laser frequencies may be a substantially linear function of the modulation of the first laser light, so that the first frequency modulation can be transferred without distortion to the second laser frequencies. The second frequency modulation may have a frequency excursion of 500 MHz to 10 GHz. A frequency spacing of the second laser frequencies may be at least 50 GHz, more typically 100 GHz or even more. As defined by the first frequency modulation, the second frequency modulation may have a modulation frequency of 1 kHz to 10 MHz.

At step 1630, the second laser light is spatially separated by a diffractive element, e.g., corresponding to the above-mentioned diffractive element 140 or 141. The diffractive element may include one or more diffractive gratings and/or one or more dispersive elements like prisms. In some scenarios, the diffractive elements may be composed of multiple diffractive and/or dispersive sub-elements.

At step 1640, the spatially separated second laser light is directed towards a ranging region. Due to the spatial separation, each of the second laser frequencies is directed towards a corresponding spatially distinct target position in the ranging region. The spacing of the second laser frequencies ensures that there is no overlap of the second laser frequencies at the target positions, irrespective of the utilized frequency modulation.

In some scenarios, directing the second laser light towards the ranging region may further involve sequentially scanning the target positions over different portions of the ranging region, e.g., like explained for the scanning mechanism 142 of FIG. 10A. In other words, the multiple different target positions, which are simultaneously illuminated by the spatially separated second laser light, may additionally be scanned over different portions of the ranging region.

At step 1650, reflections of the second laser light are received from the ranging region. At least in part, this may be accomplished through the same optical path as used for directing the second laser light towards the ranging region.

At step 1660, a frequency modulation of the reflections is simultaneously detected for each of the second laser frequencies. The detected frequency modulation is used as a basis for measuring at least one of a distance and a velocity at the target position corresponding to the respective second laser frequency.

In some scenarios, detecting the frequency modulation of the reflections may involve mixing the second laser light with the reflections of the second laser light and directing the mixed light to a photodetector, e.g., when using homodyne detection like in the detector 150 of FIG. 1.

In some scenarios, detecting the frequency modulation of the reflections may involve generating, by a further non-linear optical element, third laser light having a comb-like frequency spectrum with a plurality of third laser frequencies which have a frequency spacing offset with respect to a frequency spacing of the second laser frequencies. The frequency modulation of the reflections may then be detected by mixing the third laser light with the reflections of the second laser light and directing the mixed light to a photodetector. An example of this detection variant was explained in connection with the heterodyne detection by the detector 150' of FIG. 13A or the heterodyne detection by detector 150" of FIG. 13B. In some scenarios, mixing the third laser light with the reflections of the second laser light may be performed by a 90° optical hybrid mixer, e.g., like the optical hybrid coupler 159 of FIG. 13C.

In some scenarios, detecting the frequency modulation may involve directing light corresponding to different ones of the second laser frequencies to different ones of multiple photodetectors, e.g., like explained for the photodetectors 154 of FIG. 1.

As can be seen, the concepts as explained above may be used to enable coherent LIDAR with massively parallelized detection of multiple target positions. In this way, image acquisition rates may be increased significantly as compared to conventional single laser coherent LIDAR systems. On the other hand, complexity of the LIDAR device can be kept at a low level because the required optical frequency combs can be generated from a single pump laser source. As compared to known frequency-comb based LIDAR systems, the illustrated concepts involve spatially separating the comb teeth by diffractive optics, so that distance and/or velocity measurements can be efficiently parallelized for multiple target positions. Assuming an exemplary setup with 179 comb teeth with 50 GHz spacing in the C+L telecom wavelength bands, achievable aggregate measurement pixel rates can be as high as 17.9 M pixel/s for 100 kHz modulation frequency and 179 M pixel/s for 1 MHz modulation frequency, thus offering a significant enhancement over known TOF based and coherent LIDAR systems.

Further, the spatial separation of the comb teeth may facilitate practical implementation of the LIDAR device 100 by enabling utilization of micro- or nanophotonic optical elements and other photonic chip integration, including integrated scanning mechanisms, e.g., using integrated phase shifters or micromechanical mirrors. Further, the spatial separation of the comb teeth may also help to avoid problems related to eye safety, as excessive laser powers at a certain spot are avoided by spatially distributing the output power of the LIDAR device 100.

It is noted that the concepts as illustrated above are susceptible to various modifications. For example, various types of NOE could be utilized for generating the optical frequency comb, without limitation to a photonic microresonator. For example, the NOE could also be based on an electro-optical modulator or four-wave mixing in photonic-crystal fibers. Further, the concepts may also be implemented on the basis of various types of optical components and be combined with various known types of scanning mechanisms.

The invention claimed is:

1. A device for light detection and ranging (LIDAR), the device comprising:
   a laser light source configured to generate first laser light having a first laser frequency which is frequency modulated with a first frequency modulation;
   a non-linear optical element configured to receive the first laser light and generate therefrom second laser light having a comb-like frequency spectrum with a plurality of second laser frequencies which are each frequency modulated with a second frequency modulation defined by the first frequency modulation, with a frequency excursion of the second frequency modulation being smaller than a spacing of the second laser frequencies;
   a diffractive element configured to spatially separate the second laser light according to the second laser frequencies and direct the spatially separated second laser light towards a ranging region, with each of the second laser frequencies being directed towards a corresponding spatially distinct target position in the ranging region; and
   a detector configured to receive reflections of the second laser light from the ranging region and to measure, by simultaneously detecting a frequency modulation of the reflections for each of the second laser frequencies, at least one of a distance and a velocity at the target position corresponding to the second laser frequency.

2. The device according to claim 1,
   wherein the non-linear optical element comprises at least one photonic resonator.

3. The device according to claim 1,
   wherein the non-linear optical element is configured to generate the second laser light having the comb-like frequency spectrum based on pumping a dissipative Kerr soliton in the photonic resonator by the first laser light, and
   wherein a frequency excursion of the first frequency modulation is within a frequency range selected to support stable generation of the dissipative Kerr soliton.

4. The device according to claim 2, comprising:
   a tuning mechanism configured to modulate tuning of the photonic resonator depending on the first frequency modulation.

5. The device according to claim 2,
   wherein the non-linear optical element has at least one of a second order non-linear characteristic and a third order non-linear characteristic.

6. The device according to claim 1,
   wherein the first frequency modulation and the second frequency modulation are of a triangular type.

7. The device according to claim 1,
   wherein the second frequency modulation is a linear function of the first frequency modulation.

8. The device according to claim 1,
   wherein the second frequency modulation has a frequency excursion of 500 MHZ to 10 GHz.

9. The device according to claim 1,
   wherein a frequency spacing of the second laser frequencies is at least 50 GHz.

10. The device according to claim 1,
    wherein the second frequency modulation has modulation frequency of 1 kHz to 10 MHz.

11. The device according to claim 1, further comprising:
    a further non-linear optical element configured to generate third laser light having a comb-like frequency spectrum with a plurality of third laser frequencies which have a frequency spacing offset with respect to a frequency spacing of the second laser frequencies,
    wherein the detector is configured to detect the frequency modulation of the reflections by mixing the third laser light with the reflections of the second laser light and directing the mixed light to a photodetector.

12. The device according to claim 1,
    wherein the detector is configured to detect the frequency modulation of the reflections by mixing the second laser light with the reflections of the second laser light and directing the mixed light to a photodetector.

13. The device according to claim 1,
    wherein the detector comprises multiple photodetectors and is configured to direct light corresponding to different ones of the second laser frequencies to different ones of the multiple photodetectors.

14. The device according to claim 1, comprising:
    a scanning mechanism configured to sequentially scan the target positions over different portions of the ranging region.

15. The device according to claim 1,
    wherein the first frequency modulation is controlled by a control signal, and
    wherein the device further comprises an adjustment stage configured to measure a deviation of the first frequency modulation from a desired modulation waveform and to adjust the control signal depending on the measured deviation.

16. A method for light detection and ranging (LIDAR) the method comprising:
   generating first laser light having a first laser frequency which is frequency modulated with a first frequency modulation;
   receiving the first laser light in a non-linear optical element to generate therefrom second laser light having a comb-like frequency spectrum with a plurality of second laser frequencies which are each frequency modulated with a second frequency modulation defined by the first frequency modulation, with a frequency excursion of the second frequency modulation being smaller than a spacing of the second laser frequencies;
   spatially separating the second laser light by a diffractive element;
   directing the spatially separated second laser light towards a ranging region, with each of the second laser frequencies being directed towards a corresponding spatially distinct target position in the ranging region;
   receiving reflections of the second laser light from the ranging region; and
   measuring, by simultaneously detecting a frequency modulation of the reflections for each of the second laser frequencies, at least one of a distance and a velocity at the target position corresponding to the second laser frequency.

17. The method according to claim 16, wherein the non-linear optical element comprises at least one photonic resonator.

18. The method according to claim 17, wherein the non-linear optical element generates the second laser light having the comb-like frequency spectrum based on pumping a dissipative Kerr soliton in the photonic resonator by the first laser light, and
wherein a frequency excursion of the first frequency modulation is within a frequency range selected to support stable generation of the dissipative Kerr soliton.

19. The method according to claim 17, modulating tuning of the photonic resonator depending on the first frequency modulation.

20. The method according to claim 16, wherein the non-linear optical element has at least one of a second order non-linear characteristic and a third order non-linear characteristic.

* * * * *